United States Patent
Tan et al.

(10) Patent No.: US 11,116,210 B2
(45) Date of Patent: Sep. 14, 2021

(54) ANNATTO EXTRACTS FOR INSECT REPELLENCY, LARVICIDAL ACTIVITY AND METHODS OF USE

(71) Applicant: American River Nutrition, LLC, Hadley, MA (US)

(72) Inventors: Barrie Tan, Amherst, MA (US); Jia Zhang, Amherst, MA (US)

(73) Assignee: AMERICAN RIVER NUTRITION, LLC, Hadley, MA (US)

( * ) Notice: Subject to any disclaimer, the term of this patent is extended or adjusted under 35 U.S.C. 154(b) by 0 days.

(21) Appl. No.: 16/186,540

(22) Filed: Nov. 10, 2018

(65) Prior Publication Data

US 2019/0141995 A1    May 16, 2019

Related U.S. Application Data

(60) Provisional application No. 62/584,641, filed on Nov. 10, 2017.

(51) Int. Cl.
| | | |
|---|---|---|
| *A01N 27/00* | (2006.01) | |
| *A01N 31/02* | (2006.01) | |
| *A01N 65/08* | (2009.01) | |
| *A01N 49/00* | (2006.01) | |
| *A01N 65/00* | (2009.01) | |

(52) U.S. Cl.
CPC ............ *A01N 27/00* (2013.01); *A01N 31/02* (2013.01); *A01N 49/00* (2013.01); *A01N 65/00* (2013.01); *A01N 65/08* (2013.01)

(58) Field of Classification Search
CPC ........ A01N 27/00; A01N 31/02; A01N 65/08; A01N 49/00; A01N 65/00; Y02A 50/30
See application file for complete search history.

(56) References Cited

U.S. PATENT DOCUMENTS

| | | | |
|---|---|---|---|
| 9,693,561 B2* | 7/2017 | Mafra-Neto | ........... A01N 49/00 |
| 2002/0193437 A1 | 12/2002 | Nagatsuka et al. | |
| 2011/0262986 A1 | 10/2011 | Burbaum | |
| 2014/0031431 A1 | 1/2014 | Navarro et al. | |
| 2016/0250270 A1* | 9/2016 | Wendschuh | ......... A61K 31/122 |
| | | | 514/454 |
| 2018/0028422 A1* | 2/2018 | Kravchenko | ............ A61K 9/06 |

FOREIGN PATENT DOCUMENTS

BR        102016017229 A2    9/2017

OTHER PUBLICATIONS

Giwa-Ajeniya et al, Chemical composition of essential oils from the leaves, seeds, seed-pods and stems of *Bixa orellana* L. (Bixaceae), Archives of current research international, 6(3): 1-6, 2016. (Year: 2016).*

Cavalli et al, Composition and chemical variability of the bark oil of *Cedrelopsis grevei* H. *Baillon* from Madgascar, Flavour and Fragrance Journal, 2003, 18, 532-538. (Year: 2003).*
Judzentiene et al., Analysis of essential oils of *Artemisia absinthium* L. from Lithuania by CC, GC(RI), GC-MS and 13C NMR., Natural Product Communications, vol. 4, No. 8, Aug. 1, 2009 [retrieved on Dec. 14, 2018]. Retrieved from the Internet: <URL: https://europepmc.org/abstract/med/19768995>.abstract.
Tehri, K. and N. Singh, The role of botanicals as green pesticides in integrated mosquito management—A review. International Journal of Mosquito Research, 2015. 2(1): p. 18-23.
Zhu, J., et al., Adult repellency and larvicidal activity of five plant essential oils against mosquitoes. Journal of the American Mosquito Control Association, 2006. 22(3): p. 515-522.
Ghosh, A., N. Chowdhury, and G. Chandra, Plant extracts as potential mosquito larvicides. The Indian journal of medical research, 2012. 135(5): p. 581.
Jondiko, J., D. Akinyi, and M. Ndong'a, Mosquito repellency and larvicidal activities of essential oils from the seeds of annatto (*Bixa orellana* L.). Aspects of Applied Biology, 2009(96): p. 337-342.
Giorgi, A., et al., Secondary metabolite profile, antioxidant capacity, and mosquito repellent activity of Bixa orellanafrom Brazilian Amazon region. Journal of Chemistry, 2013. 2013.
Galindo-Cuspinera, V., M.B. Lubran, and S.A. Rankin, Comparison of volatile compounds in water-and oil-soluble annatto (*Bixa orellana* L.) extracts. Journal of agricultural and food chemistry, 2002. 50(7): p. 2010-2015.
Rodriguez, S.D., et al., The efficacy of some commercially available insect repellents for *Aedes aegypti* (Diptera: Culicidae) and*Aedes albopictus* (Diptera: Culicidae). Journal of insect Science, 2015. 15(1): p. 140.
Schmidt, E., et al., Chemical composition, olfactory evaluation and antioxidant effects of essential oil from Mentha x oiperita. Natural product communications, 2009. 4(8): p. 1107-1112.
Kumar, S., N. Wahab, and R. Warikoo, Bioefficacy of Mentha piperita essential oil against dengue fever mosquito *Aedes aegypti* L. Asian Pacific journal of tropical biomedicine, 2011. 1(2): p. 85-88.
Oyedele, A., et al., Formulation of an effective mosquito-repellent topical product from lemongrass oil. Phytomedicine, 2002. 9(3): p. 259-262.

(Continued)

*Primary Examiner* — Mina Haghighatian
(74) *Attorney, Agent, or Firm* — Troutman Pepper Hamilton Sanders LLP

(57) ABSTRACT

Health concerns of the vector-borne diseases, such as, yellow fever, malaria, dengue fever and general discomfort due to insect bites, has encouraged the development of insecticides to kill insects and insect repellents to keep insects away from treated human skin. Annatto extracts as a natural insect repellent and insecticide have many advantages over synthetic such as lower harmful side effects, low resistance, and more environmentally friendly. Annatto extracts containing ishwarane (C15) and geranyl-α-terpinene (C20) have strong mosquito repellency. Annatto extracts containing geranyl-α-terpinene (C20) and geranylgeraniol (C20) have strong larvicidal activity. Annatto extracts with approximately equal C15 and C20 composition have insect repellency, and annatto extracts with mainly C20 composition have larvicidal activity. Annatto extracts have synergistic effects with other natural extracts.

19 Claims, 14 Drawing Sheets

(56) References Cited

OTHER PUBLICATIONS

Snoussi, M., et al., Mentha spicata essential oil: chemical composition, antioxidant and antibacterial activities against planktonic and biofilm cultures of *Vibrio* spp. strains. Molecules, 2015. 20(8): p. 14402-14424.

Paranagama, P., et al., A comparison of essential oil constituents of bark, leaf, root and fruit of cinnamon (*Cinnamomum zeylanicum Blum*) grown in Sri Lanka. Journal of the National Science Foundation of Sri Lanka, 2001. 29(3-4).

Organization, W.H.O., Guidelines for efficacy testing of spatial repellents. 2013.

Organization, W.H.O., Guidelines for laboratory and field testing of mosquito larvicides. 2005.

Pino, J.A. and M.T. Correa, Chemical composition of the essential oil from annatto (*Bixa orellana* L.) seeds. Journal of Essential Oil Research, 2003. 15(2): p. 66-67.

\* cited by examiner

ANNATTO EXTRACTS FOR INSECT REPELLENCY, LARVICIDAL ACTIVITY AND METHODS OF USE

CROSS-REFERENCE TO RELATED APPLICATIONS

This is a Non-Provisional application, which claims priority to U.S. Provisional Application No. 62/584,641, which was filed on Nov. 10, 2017; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

BACKGROUND OF THE INVENTION

Insect borne diseases are a global problem, not just as a nuisance because of common skin intimacy that may last a few days, but for the diseases these insects carry and transmit to humans. Therefore, any strategy that can be implemented to deter these insects' arrival to target proximity, to kill the insects, or to prevent these insect bites is worthy of exploration and research.

Insects are species of the arthropod class Insecta. Scientifically, there are almost a million species of insects. Mosquitoes and sand flies are the important species with biting habit. There are recorded 3000 species of mosquitoes are worldwide [1]. Among them, more than 100 species are vectors or carriers of a variety of viruses, bacteria and protozoa such as yellow fever, malaria, dengue fever, West Nile virus, encephalitis, Zika virus [2]. Because of these vector-borne diseases, insecticides are used to kill insects and insect repellents are used to keep insects away from treated human skin. Compared with insecticides (mostly synthetic compounds are toxics to other unintended species including humans), insect repellents minimize interference of insect balance and avoid pollution environments.

Generally, insect repellency is a term to repel insect arrivals and insect bites to an intended target area. Ordinarily, this is referred to mosquito repellency to a living space of humans, so they may not be bitten by these mosquitoes.

Many synthetic and natural compounds typically of small molecular weights with varying degree of volatility have proved valuable as insect repellents. Various synthetic and natural insect repellents have been studied and some of them are commercially available to consumers. In United States, synthetic insect repellents, N, N-diethyl-methylbenzamide (DEET), picaridin and IR3535 are registered by Environmental Protection Agency (EPA) and recommended by Centers for Disease Control and Prevention (CDC) to avoid vector-borne diseases. DEET is widely used and a very effective insect repellent, effective against many groups of biting insects. It is available in various liquids, aerosol sprays, lotions, creams, and impregnated materials such as wristbands, wipes and candles [2].

However, because some synthetic insect repellents have unpleasant smell and harmful side effects and have residues in lakes and streams, plant-based insect repellents can serve as better alternatives to protect human, land and aquatic animals, plants and gardens. The catnip oil, citronella oil and oil of lemon *eucalyptus* have been investigated and commercially used in the market [3]. Moreover, oil of lemon *eucalyptus* is registered by EPA and recommended by CDC. Published works show that many terpenoids from plant essential oils have insect repellent effects [2, 3]. Examples are nepetalactones from catnip oil, p-menthane-3,8-diol (PMD) from oil of lemon *eucalyptus*, citronellal (CAS 106-23-0) and citronellol (CAS 106-22-9) from citronella oil, geraniol (CAS 106-24-1), limonene (CAS 5989-27-5), myrcene (CAS 123-35-3), pinene, eugenol (CAS 97-53-0), linalool (CAS 78-70-6), coumarin (CAS 91-64-5), thymol (CAS 89-83-8), citral (CAS 5392-40-5), geranyl acetone (CAS 689-64-8), and nootkatone [2].

The advantages of plant-based insect repellents are considered generally safe, environmentally friendly, and fully biodegradable and usually have pleasant and agreeable smell. However, common disadvantages are lower potency and shorter protection time compared to synthetic repellents.

Additionally, besides insect repellency, plant extracts also show potential mosquito larvicidal properties, which is easily degradable in open body of water and one of the safest methods in mosquito control. The co-evolution of plants and mosquitoes have equipped plants with chemical defense [1]. Larvicide is a type of insecticide, specifically against immature mosquitoes at the larval stage occurring in water. Compared with controlling adult mosquitoes (adulticidal activities), the approach of larviciding is safer, target specific, more pro-environment and proactive. The major insecticides in the market are synthetic such as organophosphate and organochlorine compounds, which have harmful effects on human health, prevailing non-biodegradability and persisting global insecticide resistance [4]. Compared with synthetic larvicides, plant extract larvicides are environmentally friendly and show broad spectrum activities to prevent larvae to reach insect maturity.

Essential oils extracted by steam and vacuum distillations from annatto seeds showed mosquito repellency and larvicidal activities [5, 6]. The steam distillation involved simple water extraction. The vacuum distillation involved hexane extraction and silica gel separation. The use of hexane solvent extraction, followed by hexane distillation, followed by silica chromatographic separation and hexane distillation again to obtain a "vacuum distillate" is essentially un-practicable, cost-prohibitive, and occupationally unsafe large use of inflammable solvent(s). Mosquito larvicidal activity with this vacuum distillate was higher than that of steam distillate; however, the repellent activity of vacuum and steam distillates was relatively similar. The essential oil in steam distillate had ishwarane (53%), beta-selinene (6%) and other minor components. The essential oil in vacuum distillate had geranylgeraniol (23%), ishwarane (17%) and other minor components. The other study showed hexane extract of annatto seeds provided better mosquito repellency compared with alcohol extraction [7].

BRIEF SUMMARY OF THE INVENTION

The present application focuses on insect repellency products which are spatial repellents (high volatility compounds) and/or contact repellents (intermediate volatility compounds). Spatial repellents have strong odor and are effective at a distance for protecting people from insects reaching proximity, especially mosquitoes. The most commonly employed spatial repellents in nature are volatile essential oils, C10 terpenoids. Contact repellents have weaker odor. Insects usually land on treated surface and are then repelled. Plant-based contact repellents may be C15 terpenoids.

In one embodiment of the disclosed composition, the composition comprises ishwarane, 15-hydroxy-α-muurolene, geranyl-α-terpinene, cembrene and geranylgeraniol.

In one embodiment of the disclosed composition, the composition comprises ishwarane, 15-hydroxy-α-muurolene, geranyl-α-terpinene, cembrene and geranylgeraniol, wherein concentration of ishwarane is from 5% to 25%, concentration of 15-hydroxy-α-muurolene is from 1% to 10%, concentration of geranyl-α-terpinene is from 10% to 25%, concentration of cembrene is from 1% to 15% and concentration of geranylgeraniol is from 5% to 35%.

In one embodiment of the disclosed composition, the composition comprises ishwarane, 15-hydroxy-α-muurolene, geranyl-α-terpinene, cembrene and geranylgeraniol, wherein concentration of ishwarane is from 10% to 20%, concentration of 15-hydroxy-α-muurolene is from 3% to 17%, concentration of geranyl-α-terpinene is from 15% to 20%, concentration of cembrene is from 5% to 10% and concentration of geranylgeraniol is from 10% to 30%.

In one embodiment of the disclosed composition, the composition comprises two C15 compounds and three C20 compounds.

In one embodiment of the disclosed composition, the composition comprises two C15 compounds and three C20 compounds wherein the C15 compound is a sesquiterpenoid and the C20 compound is a diterpenoid.

In one embodiment of the disclosed composition, the composition comprises two C15 compounds and three C20 compounds, wherein the sesquiterpenoid is selected from the group consisting of ishwarane, 15-hydroxy-α-muurolene; and the diterpenoid is selected form the group consisting of geranyl-α-terpinene, cembrene and geranylgeraniol.

In one embodiment of the disclosed composition, the composition comprises two C15 compounds and three C20 compounds, wherein concentration of C15 compounds is from 1% to 40% and concentration of C20 compounds is from 10% to 70%.

In one embodiment of the disclosed composition, the composition comprises two C15 compounds and three C20 compounds, wherein the concentration of C15 compounds is from 5% to 30% and concentration of C20 compounds is from 15% to 60%.

In one embodiment of the disclosed composition, the composition comprises two C15 compounds and three C20 compounds, wherein the concentration of C15 compounds is from 10% to 20% and concentration of C20 compounds is from 20% to 50%.

In one embodiment of the disclosed composition, the composition comprises ishwarane, 15-hydroxy-α-muurolene, geranyl-α-terpinene, cembrene and geranylgeraniol, wherein concentration of ishwarane is 20%, concentration of 15-hydroxy-α-muurolene is 5%, concentration of geranyl-α-terpinene is 22%, concentration of cembrene is 10% and concentration of geranylgeraniol is 6%.

In one embodiment of the disclosed composition, the composition comprises ishwarane, 15-hydroxy-α-muurolene, geranyl-α-terpinene, cembrene and geranylgeraniol, further comprises at least one of peppermint oil, lemongrass oil, spearmint oil, cinnamon oil and oil of lemon *eucalyptus*

In one embodiment of the disclosed composition, the composition comprises ishwarane, 15-hydroxy-α-muurolene, geranyl-α-terpinene, cembrene and geranylgeraniol, wherein concentration of ishwarane is 9%, concentration of 15-hydroxy-α-muurolene is 5%, concentration of geranyl-α-terpinene is 16%, concentration of cembrene is 3% and concentration of geranylgeraniol is 23%.

In one embodiment of the disclosed composition, the composition comprises ishwarane and geranyl-α-terpinene.

In one embodiment of the disclosed method, the method of repelling an arthropod comprises topical application on the skin of the composition comprising ishwarane and geranyl-α-terpinene.

In one embodiment of the disclosed method, the method of repelling an arthropod comprises topical application on the skin of the composition comprising ishwarane and geranyl-α-terpinene, wherein the arthropod is selected from the group consisting of insect and arachnid.

In one embodiment of the disclosed method, the method of repelling an arthropod comprises topical application on the skin of the composition comprising ishwarane and geranyl-α-terpinene, wherein the arthropod is selected from the group consisting of insect and arachnid, wherein the insect is selected from the group consisting of mosquito and sandfly.

In one embodiment of the disclosed method, the method of repelling an arthropod comprises topical application on the skin of the composition comprising ishwarane and geranyl-α-terpinene, wherein the arthropod is selected from the group consisting of insect and arachnid, wherein the arachnid is a tick.

In one embodiment of the disclosed composition, the composition comprises geranylgeraniol and geranyl-α-terpinene.

In one embodiment of the disclosed method, the method of killing an arthropod comprises application of the composition comprising geranylgeraniol and geranyl-α-terpinene.

In one embodiment of the disclosed method, the method of killing an arthropod comprises application of the composition comprising geranylgeraniol and geranyl-α-terpinene, wherein the arthropod is selected from the group consisting of insect and arachnid.

In one embodiment of the disclosed method, the method of killing an arthropod comprises application of the composition comprising geranylgeraniol and geranyl-α-terpinene, wherein the arthropod is selected from the group consisting of insect and arachnid, wherein the insect is selected from the group consisting of mosquito and sandfly.

In one embodiment of the disclosed method, the method of killing an arthropod comprises application of the composition comprising geranylgeraniol and geranyl-α-terpinene, wherein the arthropod is selected from the group consisting of insect and arachnid, wherein the arachnid is a tick.

In one embodiment of the disclosed method, the method of repelling an arthropod comprises topical application of the composition comprises ishwarane, 15-hydroxy-α-muurolene, geranyl-α-terpinene, cembrene and geranylgeraniol on the skin.

In one embodiment of the disclosed method, the method of repelling an arthropod comprises topical application of the composition comprises ishwarane, 15-hydroxy-α-muurolene, geranyl-α-terpinene, cembrene and geranylgeraniol on the skin, wherein the arthropod is selected from the group consisting of insect and arachnid.

In one embodiment of the disclosed method, the method of repelling an arthropod comprises topical application of the composition comprises ishwarane, 15-hydroxy-α- muurolene, geranyl-α-terpinene, cembrene and geranylgeraniol on the skin, wherein the arthropod is selected from the group consisting of insect and arachnid, wherein the insect is selected from the group consisting of mosquito and sandfly.

In one embodiment of the disclosed method, the method of repelling an arthropod comprises topical application of the composition comprises ishwarane, 15-hydroxy-α-muurolene, geranyl-α-terpinene, cembrene and geranylgeraniol on the skin, wherein the arthropod is selected from the group consisting of insect and arachnid, wherein the arachnid is a tick.

In one embodiment of the disclosed method, the method of killing an arthropod comprises application of compound of the composition comprises ishwarane, 15-hydroxy-α-muurolene, geranyl-α-terpinene, cembrene and geranylgeraniol.

In one embodiment of the disclosed method, the method of killing an arthropod comprises application of compound of the composition comprises ishwarane, 15-hydroxy-α-muurolene, geranyl-α-terpinene, cembrene and geranylgeraniol, wherein the arthropod is selected from the group consisting of insect and arachnid.

In one embodiment of the disclosed method, the method of killing an arthropod comprises application of compound of the composition comprises ishwarane, 15-hydroxy-α-muurolene, geranyl-α-terpinene, cembrene and geranylgeraniol, wherein the arthropod is selected from the group consisting of insect and arachnid, wherein the insect is selected from the group consisting of mosquito and sandfly.

In one embodiment of the disclosed method, the method of killing an arthropod comprises application of compound of the composition comprises ishwarane, 15-hydroxy-α-muurolene, geranyl-α-terpinene, cembrene and geranylgeraniol, wherein the arthropod is selected from the group consisting of insect and arachnid, wherein the arachnid is a tick.

In one embodiment of the disclosed method, the method of vacuum distillation to remove very volatiles (≤C10) with at least two distillation steps at ≤100° C., and then distilled to obtain normal volatiles (C15 and C20) at >100° C.

In one embodiment of the disclosed composition, blending of mono-, sesqui- and diterpenoids of annatto extracts provide an optimal effect.

In one embodiment of the disclosed composition, annatto extracts have insect repellent potentials, where blending of mono-, sesqui- and diterpenoids of annatto extracts provide an optimal effect.

In one embodiment of the disclosed composition, annatto extracts have larvicidal activity, where blending of mono-, sesqui- and diterpenoids of annatto extracts provide an optimal effect.

In one embodiment of the disclosed composition, annatto extracts have various insect repellent potentials and contact killing, such as, larvicidal activity, where the ratio of monoterpenoids to sesquiterpenoids is 1:99 to 99:1.

In one embodiment of the disclosed composition, annatto extracts have various insect repellent potentials and contact killing, such as, larvicidal activity, where the ratio of monoterpenoids to sesquiterpenoids is 25:75 to 75:25.

In one embodiment of the disclosed composition, annatto extracts have various insect repellent potentials and contact killing, such as, larvicidal activity, where the ratio of monoterpenoids to diterpenoids is 1:99 to 99:1.

In one embodiment of the disclosed composition, annatto extracts have various insect repellent potentials and contact killing, such as, larvicidal activity, where the ratio of monoterpenoids to diterpenoids is 25:75 to 75:25.

In one embodiment of the disclosed composition, annatto extracts have various insect repellent potentials and contact killing, such as, larvicidal activity, where the ratio of sesquiterpenoids to diterpenoids is 1:99 to 99:1.

In one embodiment of the disclosed composition, annatto extracts have various insect repellent potentials and contact killing, such as, larvicidal activity, where the ratio of sesquiterpenoids to diterpenoids is 25:75 to 75:25.

In one embodiment of the disclosed composition, annatto extracts have various insect repellent potentials and contact killing, such as, larvicidal activity, where the ratio of sesquiterpenoids to diterpenoids is 50:50.

In one embodiment of the disclosed composition, annatto extracts have insect repellency and larvicidal potentials, where the ratio of ishwarane to geranyl-α-terpinene is 25:75 to 75:25.

In one embodiment of the disclosed composition, annatto extracts have insect repellency and larvicidal potentials, where the ratio of ishwarane to geranyl-α-terpinene is 40:60 to 60:40.

In one embodiment of the disclosed composition, annatto extracts have larvicidal activity, where the ratio of geranylgeraniol to total of sesquiterpenoids and diterpenoids is 1:100 to 99:100.

In one embodiment of the disclosed composition, annatto extracts have larvicidal activity, where the ratio of geranylgeraniol to total of sesquiterpenoids and diterpenoids is 20:100 to 90:100.

In one embodiment of the disclosed composition, annatto extracts have larvicidal activity, where the ratio of geranylgeraniol to total of sesquiterpenoids and diterpenoids is 40:100 to 60:100.

In one embodiment of the disclosed composition, the combination of annatto extracts and an essential oil selected from the group of peppermint oil, lemongrass oil, spearmint oil, cinnamon oil, oil of lemon *eucalyptus*, containing different ratios of composite monoterpenoids, sesquiterpenoids and diterpenoids have synergistic effects.

In one embodiment of the disclosed composition, annatto extracts with around 0.1-1.0% tocotrienols have antioxidant shelf life extension for insect repellent and larvicides.

In one embodiment of the disclosed composition, annatto extracts with insect repellency and larvicidal potentials are in aerosol sprays, lotions, creams, liquids, wristbands, wipes, and candles.

In one embodiment of the disclosed composition, annatto extracts with insect repellency and larvicidal potentials comprise a combination of geranyl-α-terpinene and geranylgeraniol.

In one embodiment of the disclosed composition, preparations with enhanced insect repellency and larvicidal activity contain combinations of annatto extracts and oil of lemon *eucalyptus*.

In one embodiment of the disclosed composition, preparations with enhanced insect repellency and larvicidal activity contain combinations of annatto extracts and oil of lemon *eucalyptus* at a ratio of 50:30.

In one embodiment of the disclosed composition, preparations with enhanced insect repellency and larvicidal activity contain combinations of annatto extracts and DEET.

In one embodiment of the disclosed composition, preparations with enhanced insect repellency and larvicidal activity contain combinations of annatto extracts, oil of lemon *eucalyptus*, and DEET.

In one embodiment of the disclosed composition, preparations with enhanced insect repellency and larvicidal activity contain combinations of annatto extracts and triglyceride oils.

In one embodiment of the disclosed composition, a natural emulsifier quillaja is added to reduce surface tension to provide a wide but thin surface layer on water bodies for larvicidal property.

In one embodiment of the disclosed composition, the composition comprises a combination of medium chain length fatty acids from coconut oil and annatto extracts have synergistic effects on insect repellency and larvicides.

In one embodiment of the disclosed method, the method of vacuum distillation obtains a higher portion of diterpenoids (C20) and a lower portion of sesquiterpenoids (C15).

In one embodiment of the disclosed method, the method of vacuum distillation removes very volatiles (≤C10) with at least two distillation steps at ≤100° C., and then distilled to obtain normal volatiles (C15 and C20) at >100° C.

In one embodiment of the disclosed method, the method of vacuum distillation is solvent free process.

In one embodiment of the disclosed method, the method of vacuum distillation uses a pressure around 0.02 torr.

In one embodiment of the disclosed method, the method of vacuum distillation has a 2-3 passes.

In one embodiment of the disclosed method, the method of vacuum distillation obtains AOE 1, AOE 2 and AOE 3 from the first and/or the second pass.

In one embodiment of the disclosed method, the method of vacuum distillation obtains tocotrienols from the third pass.

In one embodiment of the disclosed method, the method of vacuum distillation the distillation condition for pass 1 and/or 2 is 120° C.-130° C. and 0.03-0.08 torr and the distillation condition for pass 3 is 198° C.-210° C. and 0.01-0.09 torr.

In one embodiment of the disclosed method, the method of vacuum distillation to obtain annatto oil extracts uses up to total 5 passes.

In one embodiment of the disclosed method, the method of vacuum distillation The condition in pass 1 may be around 120° C.-160° C. and vacuum may be around 0.03-2 torr.

In one embodiment of the disclosed method, the method of vacuum distillation, the condition in pass 2 is around 160° C.-170° C. and vacuum may be around 0.03-0.6 torr.

In one embodiment of the disclosed method, the method of vacuum distillation obtains AOE 1 from pass 1 and AOE 2 and 3 from pass 2.

In one embodiment of the disclosed method, the method of vacuum distillation to obtain high concentrations of a specific compound, such as, geranylgeraniol (90% in AOE 3) pass 2 is repeated several times.

In one embodiment of the disclosed method, the method of vacuum distillation obtains differences between AOE 1, AOE 2 and AOE 3 by changing the process.

In one embodiment of the disclosed method, the method of vacuum distillation obtains compounds in AOE 3 which are 90% geranylgeraniol (diterpenoid) with higher molecular weight from process with higher temperature and vacuum.

In one embodiment of the disclosed method, the method of vacuum distillation obtains compounds in AOE 2 of intermediate molecular weight from process with intermediate temperature and vacuum.

In one embodiment of the disclosed method, the method of vacuum distillation obtains the compounds in AOE 1 with lower molecular weight from process with lower temperature and vacuum.

In one embodiment of the disclosed method, the method of vacuum distillation allows repeatable production of AOE 1, AOE 2 and AOE 3.

In one embodiment of the disclosed method, the method of vacuum distillation in pass 3-5 the major component of annatto extract is tocotrienols.

In one embodiment of the disclosed method, the method of vacuum distillation in pass 1-2, the major components are terpenoids with lower molecular weight, since the process is milder.

In one embodiment of the disclosed method, the method of vacuum distillation focuses on the terpenoids with lower molecular weight compared with tocotrienols by using milder process.

In one embodiment of the disclosed composition, tocotrienols are used as antioxidants to extend shelf life of insect repellent and larvicides.

In one embodiment of the disclosed method, the method of vacuum distillation obtains annatto oil extracts with monoterpenoids by using milder a process, such as, lower temperature and vacuum.

In one embodiment of the disclosed method, the method of vacuum distillation obtains concentrations from 3% to 30% of monoterpenoids from annatto oil extract with a milder process.

In one embodiment of the disclosed method, the method of vacuum distillation produces the composition with major monoterpenoids of α-pinene, β-pinene, camphene, limonene, myrecene, cis-ocimene, chrysanthenone, and eucarvone.

In one embodiment of the disclosed composition, the monoterpenoids, specifically α-pinene, β-pinene, camphene, limonene and myrecene, have insect repellent potential and larvicidal activity.

In one embodiment of the disclosed composition, the combination of monoterpenoids, and sesquiterpenoid and diterpenoid in AOE 1 has strong insect repellent potential.

In one embodiment of the disclosed composition, the combination of these monoterpenoids, and sesquiterpenoid and diterpenoid of AOE 2 have strong larvicidal activity.

In one embodiment of the disclosed composition, the ratio of ishwarane to geranyl-α-terpinene in AOE 1 has strong insect repellency.

In one embodiment of the disclosed composition, the ratio of ishwarane to geranyl-α-terpinene in AOE 2 has strong larvicide activity.

In one embodiment of the disclosed composition, the annatto oil extract has diterpenoids in the range from 40% to 75% and has sesquiterpenoids in the range from 13% to 45%.

In one embodiment of the disclosed composition, AOE 3 has 90% geranylgeraniol.

In one embodiment of the disclosed composition, AOE 3 has 91% of diterpenoids.

In one embodiment of the disclosed composition, the concentration of geranylgeraniol to sesquiterpenoids and diterpenoids is 99%.

In one embodiment of the disclosed composition, AOE 2 has 23% geranylgeraniol.

In one embodiment of the disclosed composition, AOE 2 has 16% of sesquiterpenoids and 74% of diterpenoids.

In one embodiment of the disclosed composition, the concentration of geranylgeraniol to sesquiterpenoids and diterpenoids is 26%.

In one embodiment of the disclosed composition, AOE 1 has 6% geranylgeraniol.

In one embodiment of the disclosed composition, AOE 1 has 38% of sesquiterpenoids and 52% diterpenoids.

In one embodiment of the disclosed composition, the concentration of geranylgeraniol to sesquiterpenoids and diterpenoids is 7%.

Having described embodiments of the disclosed compositions and methods, it will now become apparent to those of ordinary skill in the art that other embodiments incorporating these concepts may be used. Accordingly, it is submitted that the disclosed compositions and method should not be limited to the described embodiments but rather should be limited only by the spirit and scope of the appended claims.

DETAILED DESCRIPTION OF THE INVENTION

Definitions and Methods

Figure 1:
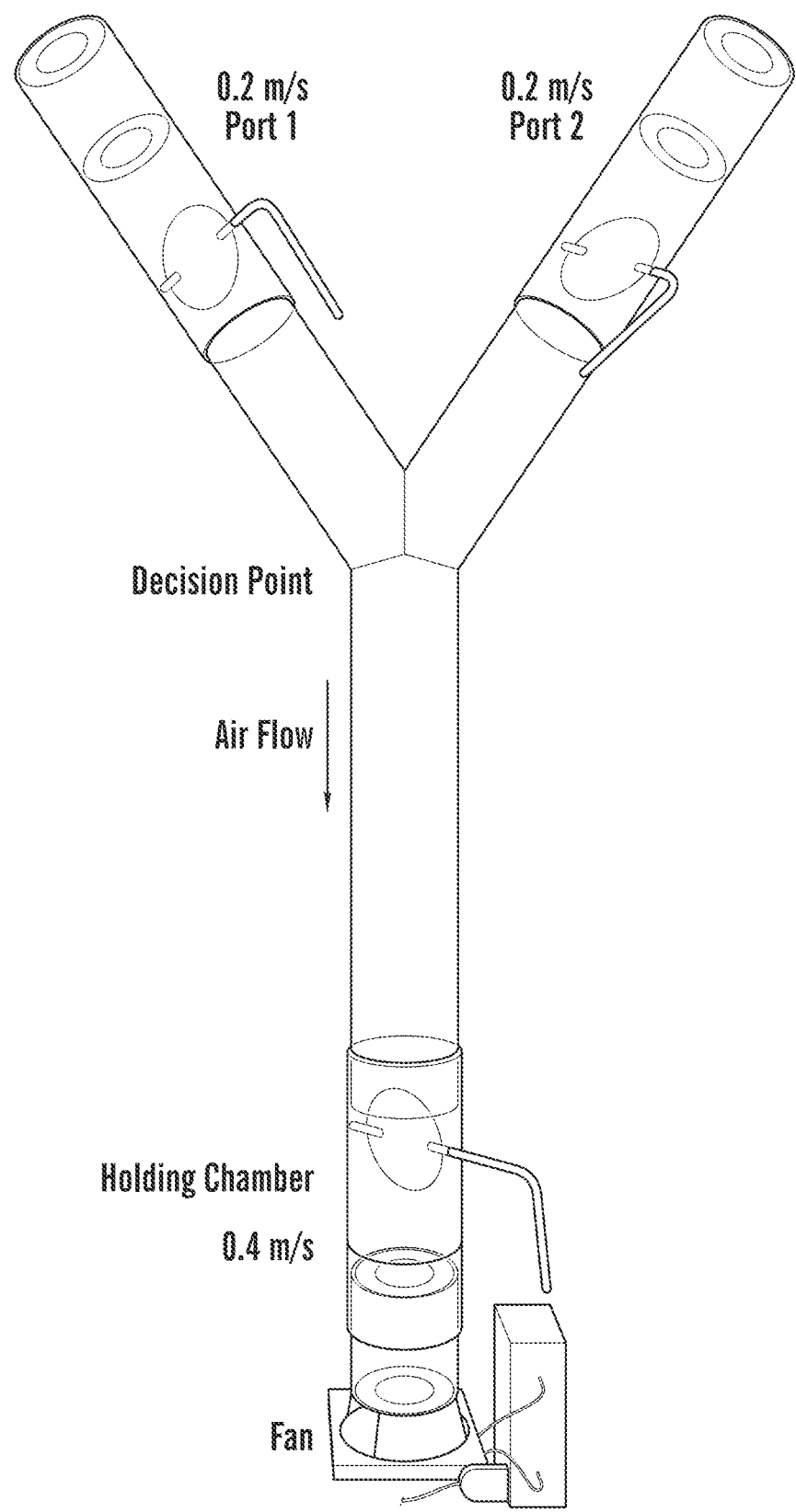
FIG. 1 shows a Y-tube olfactometer.

*Aedes aegypti* (Yellow fever mosquito): Female mosquitoes, *Aedes aegypti*, are used to determine the efficacy of annatto extract's repellency tests [10]. This species is known as human disease vectors to transmit dengue fever, chikungunya, yellow fever and other diseases [10].

Arthropod: An arthropod is an invertebrate animal having an exoskeleton (external skeleton), a segmented body, and paired jointed appendages. Arthropods include insects, arachnids, myriapods, and crustaceans.

Disease-transmitted vectors: According to WHO, vectors are living organisms transmitting infectious diseases from animals to humans or between humans. Many of these vectors are bloodsucking insects. Mosquitoes and sandflies as insects are the best known disease vector. Ticks as disease vector belong to arachnids. Arthropods includes insects, arachnids, myriapoda and crustaceans.

EPA 25 list: It is the list of active ingredients that can be used in pesticide products that are exempt from the Federal Insecticide, Fungicide, and Rodenticide Act (FIFRA) under the Minimum Risk Exemption regulations in 40 CFR 152.25(f).

Terpene and terpenoid: Terpenes are hydrocarbons and terpenoids are derived from terpenes with oxygen-containing functional groups. Sometimes they are called isoprenoids and used interchangeably. Both of them are large and diverse classes of naturally occurring organic compounds, which account for 60% of known natural products.

Oil of lemon *eucalyptus* (OLE): The lemon scented *eucalyptus* essential oil as unrefined oil from the tree *eucalyptus citriodora* mainly consists of citronellal, around 70-80%. During refining process, citronellal content is converted into p-menthane-3, 8-diol (PMD). PMD is C10 and a monoterpenoid. With *eucalyptus* leaves aging, this conversion process can occur naturally. Refined oil with high concentration of PMD is used in insect repellents and unrefined oil is usually used in perfumery. OLE is registered in United States as refined oil and mainly consists of PMD.

Peppermint oil (CAS 8006-09-4): It is in EPA 25 list. It mainly consists of 40% of menthol and 20% of menthone. Both menthol and menthone are C10 and monoterpenoids. Other components of less than 10% are menthyl acetate, 1,8-cineole, limonene, and beta-caryophyllene pinene [11]. Peppermint oil is known to repel mosquitoes [12].

Lemongrass oil (CAS: 8007-02-1): It is in EPA 25 list. Citral is the most abundant compound in many different species of lemongrass (genus *Cymbopogon*), and it is up to 80% in lemongrass oil. Citral is C10 and a monoterpenoid. Other compounds in lemongrass oil are geraniol, geranyl acetate, borneol, estragole, citronellal, limonene, methyleugenol, beta-myrcene, piperitone, carene-2, alpha-terpineole, pinene, farnesol, proximadiol, and cymbodiacetal. Lemongrass oil has been shown to have mosquito repellency [13].

Spearmint oil (CAS: 8008-79-5): It is in EPA 25 list. It mainly consists of 40% of carvone and 20% limonene, both of which are C10. Carvone is a monoterpenoid and limonene is a monoterpene. Other constituents are dihydrocarvone and 1,8-cineol [14]. Spearmint oil has been used as a mosquito repellent.

Cinnamon oil (CAS: 8015-91-6): It is in EPA 25 list. Here, the cinnamon oil refers to cinnamon bark oil extracted from *Cinnamomum zeylanicum*, which is used as a flavoring in medicinal preparation and perfumery. The major component is cinnamaldehyde (C9), around 50% [15]. Cinnamon oil has been tested to repel mosquitoes and effective insecticide against mosquito larvae.

Y-tube olfactometer: The experiments were performed with a Y-tube olfactometer according to World Health Organization in its publication "Guidelines for efficacy testing of spatial repellents" (World Health Organization [WHO] 2013) [16]. This device was used for evaluation of the efficacy of mosquito repellents. The Y-tube parts include: holding chamber, Y-shaped flyway, and ports (FIG. 1). An airflow of 0.4 m/sec was produced with a fan at the bottom of the Y-tube.

Figure 2:
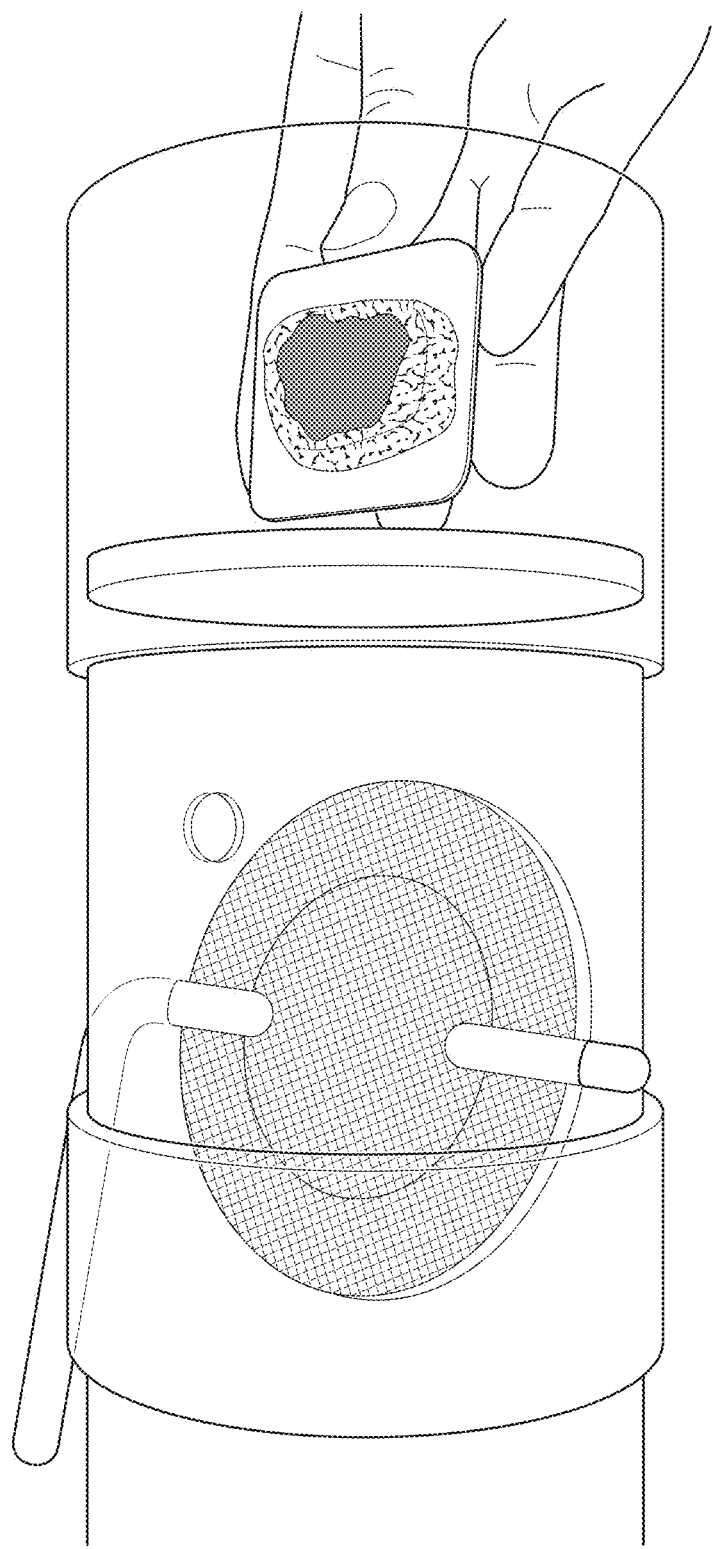
FIG. 2 shows a sample with hand.
Figure 3:
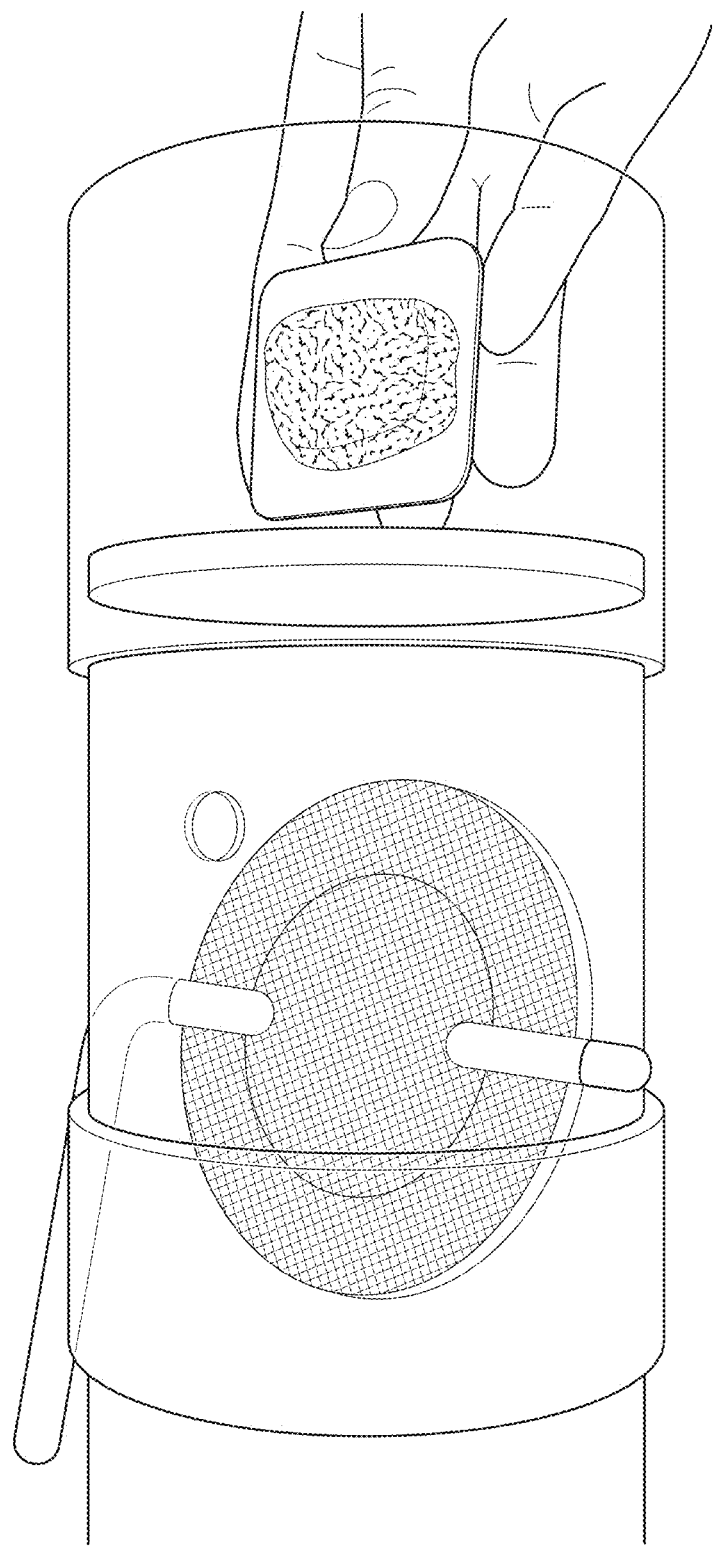
FIG. 3 shows a control with hand.

Insect repellency experiment design: For each experiment, one port was empty blank, and the other port was hand port holding liquid-soaked cotton balls as treatment. Treatments included a control and a sample (FIG. 2 and FIG. 3). The control is mineral oil. Left and right ports were used alternatively to avoid side bias. Approximately 1 mL each of control and sample were applied as treatments to cotton balls. Four replicates were performed per treatment. Mosquitoes were starved of water and sugar for at least 12 hours and 15-30 female mosquitoes per replicate were placed in the closed holding chamber and acclimated for 30 seconds. After 45 seconds, all trap doors were opened, and mosquitoes were allowed to relocate for approximately 2 minutes. The trap doors were closed and the number of mosquitoes in chambers and in flyway was documented. At the end, mosquitoes were removed and discarded from the Y-tube.

Synergism: When two or more compounds (or drugs) are administered together, they may have interactive effects including synergistic (increased effect), additive or antagonistic effect (decreased effect). Synergism as an interactive effect of the mixed essential oil was demonstrated in the experiments.

LD50 and LD95: LD is lethal dose. LD50 is that the amount of annatto extract, given all at once, that causes the death of 50% of mosquito larvae. LD95 is that the amount of annatto extract, given all at once, that causes the death of 95% of mosquito larvae.

DESCRIPTION OF THE INVENTION

Annatto (*Bixa Orellana* L.) has wide-ranging terpenoids including very volatile compounds (<C10), monoterpenoids (C10), sesquiterpenoids (C15), diterpenoids (C20), and higher molecular weight terpenoids (>C20). Annatto extracts have materially uncontrolled and unstandardized volatile compositions, such as 10% monoterpenoids and 90% sesquiterpenoids to 50% monoterpenoids and 40% sesquiterpenoids. Steam distillation, solvent extraction and/or vacuum distillation will produce sesquiterpenoids, diterpenoids and other terpenoids [5, 8, 9]. The composition depends on process conditions, for which production control and standardization do not exist.

Surprisingly, annatto extracts have lower amounts of high volatile components, approximately C10 as monoterpenoids; higher amounts of intermediate volatile components, approximately C15 as sesquiterpenoids; higher amounts of low volatile components, approximately C20 as diterpenoids; lowest amounts of the least volatile components, C20-C30 as other terpenoids. Such annatto extract composition bears the most insect repellency.

Blending of mono-, sesqui-, diterpenoids and others from annatto extracts can provide an optimal spatial and contact repellency, and contact kill such as larvicidal potential. Further, unlike traditional insecticides based on a single compound, annatto extracts comprise of blends of mono-, sesqui-, diterpenoids and other compounds, which have low possibility for insects to develop resistance.

This application focuses on insect repellents and larvicidal activity of natural compounds. Without limitation, the description below highlights this understanding. It is based on natural extracts of annatto components and their combination to other plant-based materials.

High Volatility Compounds

These compounds have spatial repellency because of their strong odor and vapor easily detectable by insects in space. Their application presents deterrence to a treated space, away from a target. These compounds may be C10 type monoterpenoids often obtained from mangle-pressed, steam-distillated or hydro distillated plant materials.

Intermediate Volatility Compounds

These compounds have spatial and contact repellency because they have weaker odor and vapor and moderately detectable by insects upon contact. Their application causes deterrence of bites to a treated target. These compounds may be C15 type sesquiterpenoids often obtained from solvent-extracted and/or vacuum-distillated from plant materials.

Low Volatility Compounds

These compounds have contact killing (that may not have repellency) such as larvicide because they have the weakest odor and vapor, or odorless to the insect upon contact. Their application causes insects at their various life stages to arrest in their growth cycle. These compounds may be C20 or C20-C30 type diterpenoids often obtained from solvent-distillated plant materials.

Different compositions of annatto extracts can be used as liquids, aerosol sprays, lotions, creams and impregnated materials (wipes, wristbands, and candles).

In emulsion formulations, vegetable triglycerides and certain excipients are commonly used to increase efficacy and extend effective hours. Emulsions with natural emulsifiers (quillaja), annatto extracts and others extend the efficacies.

Wax-based formulations also increase the duration of repellency of annatto extracts. The combination of annatto extract fractions containing varying amounts of monoterpenoids, sesquiterpenoids and diterpenoids may be incorporated to perform the range of repellency described above.

The combination of annatto extracts and known insect repellents such as peppermint oil, lemongrass oil, spearmint oil, cinnamon oil, oil of lemon *eucalyptus*, catnip oil, and citronella oil containing different ratios of composite monoterpenoids, sesquiterpenoids and diterpenoids show synergistic effects.

Vitamin E, tocopherols and tocotrienols are used as antioxidants to protect these terpenoids, extending their shelf-life upon storage, thereby maintaining terpenoid insect repellency and larvicide potency.

Experimental examples are not meant to be limiting but illustrative of the scope and invention of this patent.

EXAMPLES

Example 1

Administration of Annatto Extracts Having Insect Repellency

Y-tube assay is used to test insect repellency of annatto extracts. Approximately 1 mL liquid of mineral oil (negative control), 30% oil of lemon *eucalyptus*, 98% DEET (positive control) or different concentrations of annatto extracts (test compounds) were applied as treatments to cotton balls. Different concentrations of samples were diluted using mineral oil (Table 1).

Figure 4:
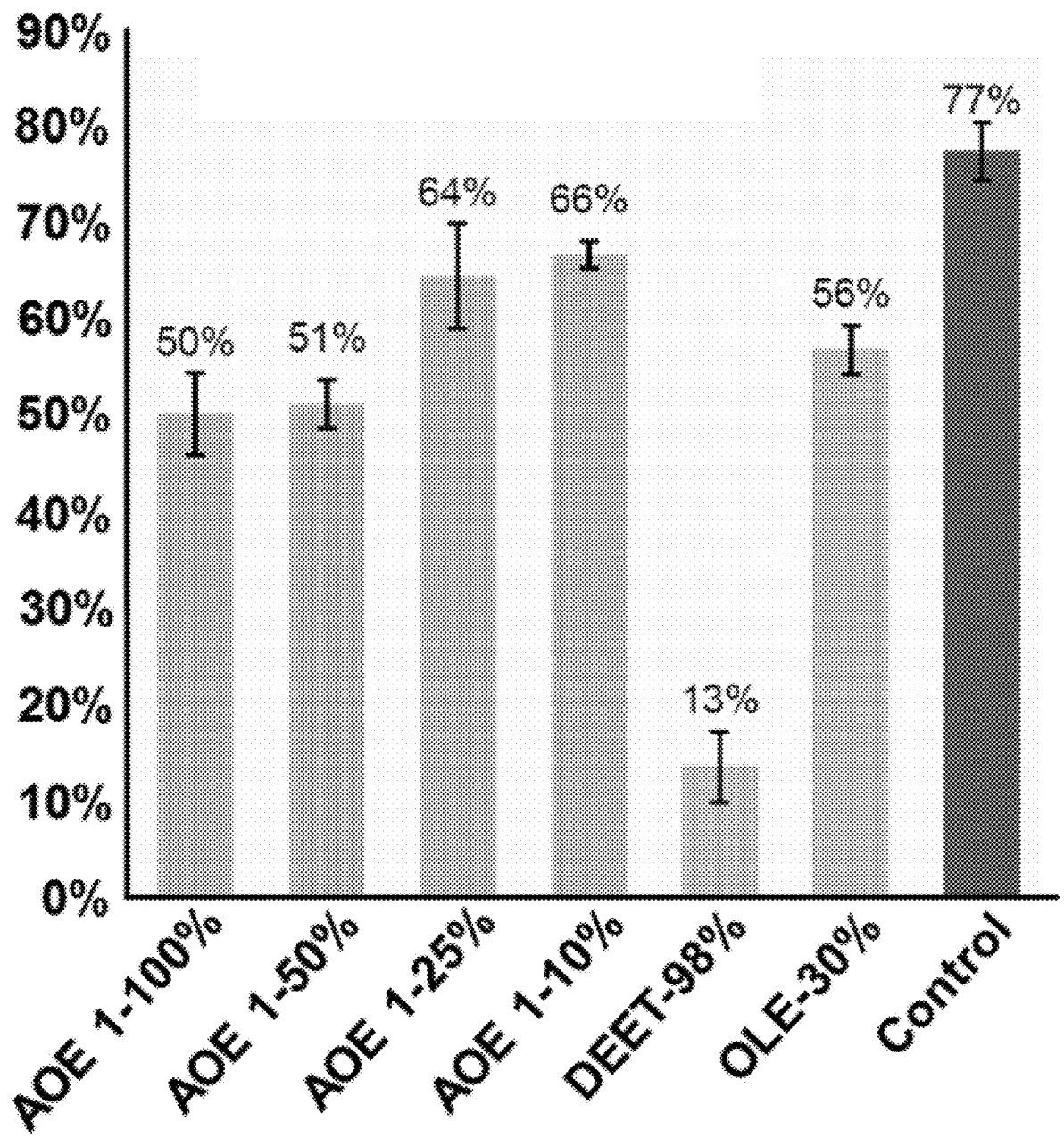
FIG. 4 shows the Y-tube results: percent attraction per treatment. AOE is annatto extract. DEET is N, N-diethyl-3-methylbenzamide. OLE is oil of lemon *eucalyptus*. The control was a cotton ball treated with mineral oil.

The results are shown in FIG. 4 and Table 2. The 100% of annatto extract 1 resulted in a significant reduction in attraction as compared with the control. Oily annatto extract 1 maintained its repellency after a 50% dilution; however, lost its efficacy at a 25% and 10% dilution. The 50% of annatto extract 1 (P<0.001) was better than 30% oil of lemon *eucalyptus* (P<0.01%) for insect repellency. The 98% of DEET expectedly had the strongest repellency.

TABLE 1

Dilution of annatto extraction (AOE) with mineral oil.

| Dilution (%) | Mineral Oil mL | AOE mL | Total mL |
|---|---|---|---|
| AOE 1-100% | 0 | 10 | 10 |
| AOE 1-50% | 5 | 5 | 10 |
| AOE 1-25% | 7.5 | 2.5 | 10 |
| AOE 1-10% | 9 | 1 | 10 |

TABLE 2

Statistical treatment analysis of Y-tube bioassays.

| Comparison | Significance | P-value |
|---|---|---|
| AOE 1-100% VS Control | ** | P < 0.001 |
| AOE 1-50% VS Control | ** | P < 0.001 |
| AOE 1-25% VS Control | NS | P > 0.05 |
| AOE 1-10% VS Control | NS | P > 0.05 |
| DEET-98% VS Control | ** | P < 0.001 |
| OLE-30% VS Control | * | P < 0.01 |

NS—not significant and *, ** - significantly different.
AOE is annatto extract.
DEET is N,N-diethyl-3-methylbenzamide.
OLE is oil of lemon *eucalyptus*.
The control was a cotton ball treated with mineral oil.

Example 2

The Equivalency of Annatto Extract to DEET and its Protection Time

DEET is the most common active insect repellent, a gold standard for repellency comparison. This study aimed to find a comparable percentage of DEET that maintained the same repellency as annatto extract by Y-tube assay. Six concentrations of DEET (1-30%) were tested for various protection time (1-4 hours). Annatto extract was expected to equate 20% DEET and for a 2 hour repellency duration.

Example 3

Synergistic Effects of Adding Oil of Lemon *Eucalyptus*, Peppermint, Lemongrass, Spearmint and Cinnamon Oil to Annatto Extract Synergistic effects of mixture of annatto extract (AOE) and five essential oils, cinnamon bark oil (CAS 8015-91-6), peppermint oil (CAS 8006-09-4), lemongrass oil (CAS 8007-02-1), spearmint oil (CAS 8008-79-5), oil of lemon *eucalyptus* were tested by Y-tube assay. The composition of ten tested mixtures is: 1) cinnamon bark oil & AOE (1:1); 2) peppermint oil & AOE (1:1); 3) lemongrass oil & AOE (1:1); 4) spearmint oil & AOE (1:1); 5) oil of lemon *eucalyptus* & AOE (1:1); 6) oil of lemon *eucalyptus* & AOE & cinnamon bark oil (1:1:1); 7) oil of *eucalyptus* & AOE & peppermint oil (1:1:1); 8) oil of lemon *eucalyptus* & AOE & lemongrass oil (1:1:1); 9) oil of lemon *eucalyptus* & AOE & spearmint oil (1:1:1); 10) oil of lemon *eucalyptus* & AOE & cinnamon bark oil & peppermint oil & lemongrass oil & spearmint oil (1:1:1:1:1:1).

Example 4

Larvicidal Activity of Annatto Extracts

The guidelines of the World Health Organization for laboratory and field testing of mosquito larvicides were followed [17]. Fourth instar larvae of the yellow fever mosquito *Aedes aegypti* were used to determine larvicidal activity of annatto extracts. The lethal concentration (LC) of the different annatto extracts for 50% and 95% mortality (LC50 and LC95) for fourth instar larvae of the yellow fever mosquito *Aedes aegypti* were determined after 1 and 24 hours.

Figure 5:
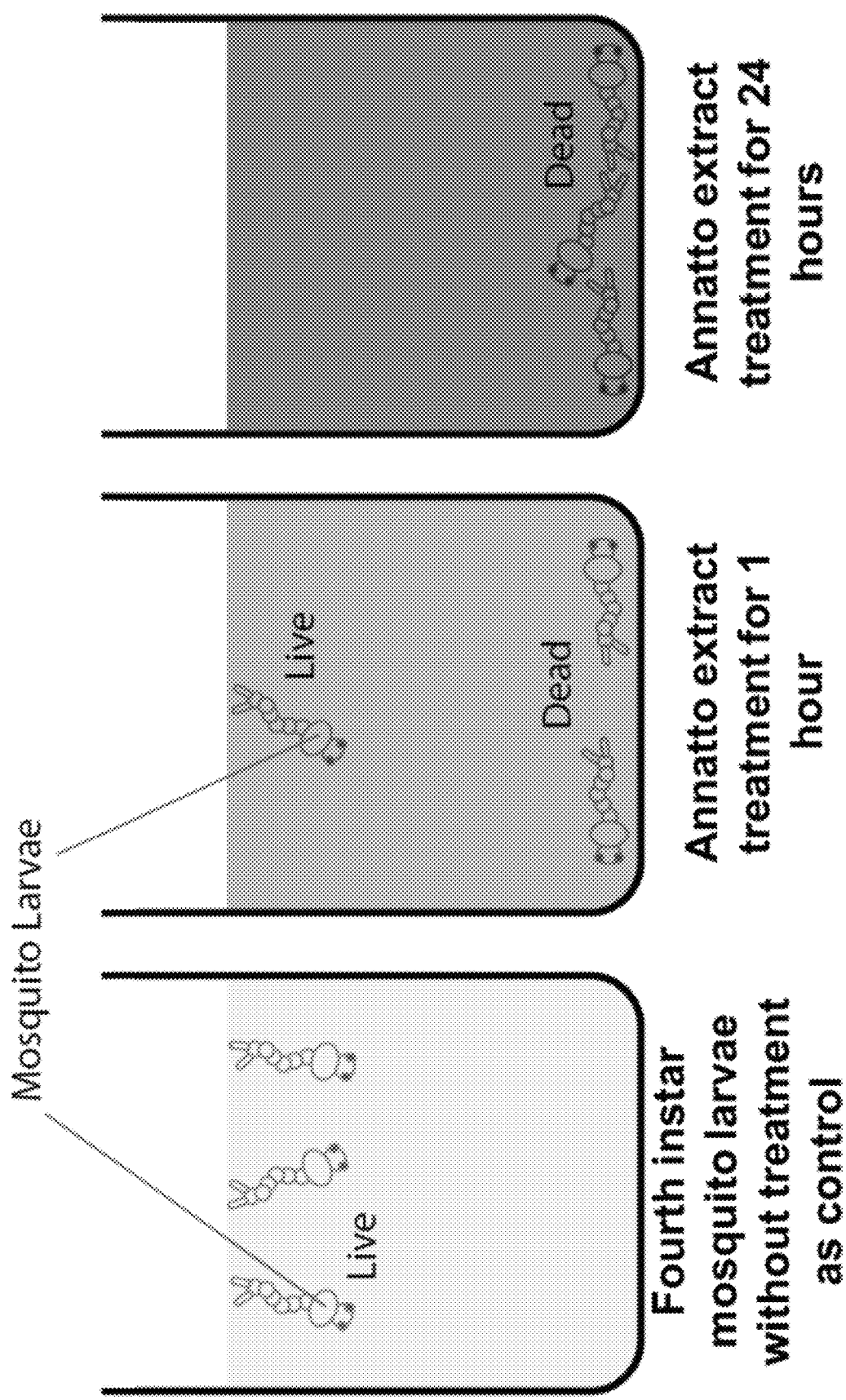
FIG. 5 illustrates the experimental design and cartoon representation of larvicidal studies.

Mosquitoes (*Aedes aegypti*) were cultured. After hatching the larvae were cultured in 1 L plastic pans at 28° C. and fed with grounded cat food. 20 fourth instar larvae were transferred in disposable test cups with 200 mL of distilled water (FIG. 5). Various amounts of the annatto extracts were added to the water. The cups were incubated at room temperature for 24 hours. Larval mortality was documented after 1 and 24 hours. Based on the above results, LC50 and LC95 were calculated by using a log dosage-probit mortality regression line.

Example 5

Larvicidal Activity of Annatto Extract 1

Figure 6:
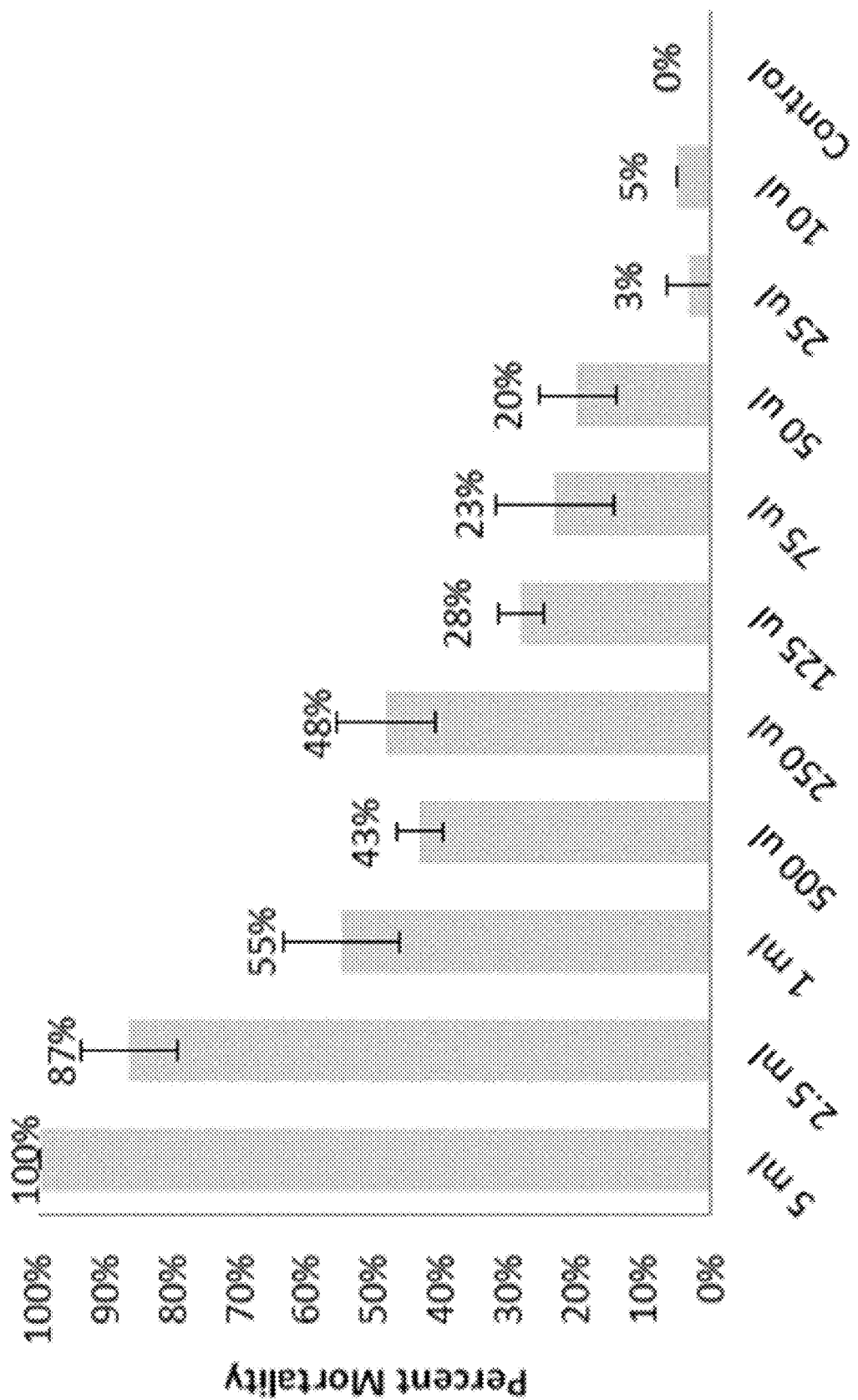
FIG. 6 illustrates the larvicidal activity of annatto extract 1 (AOE 1) after 1 hour post exposure. Y-axis represents the percent mortality after 1 hour of exposure to AOE 1. X-axis represents the amount of the AOE 1 added to 200 mL of distilled water.
Figure 7:
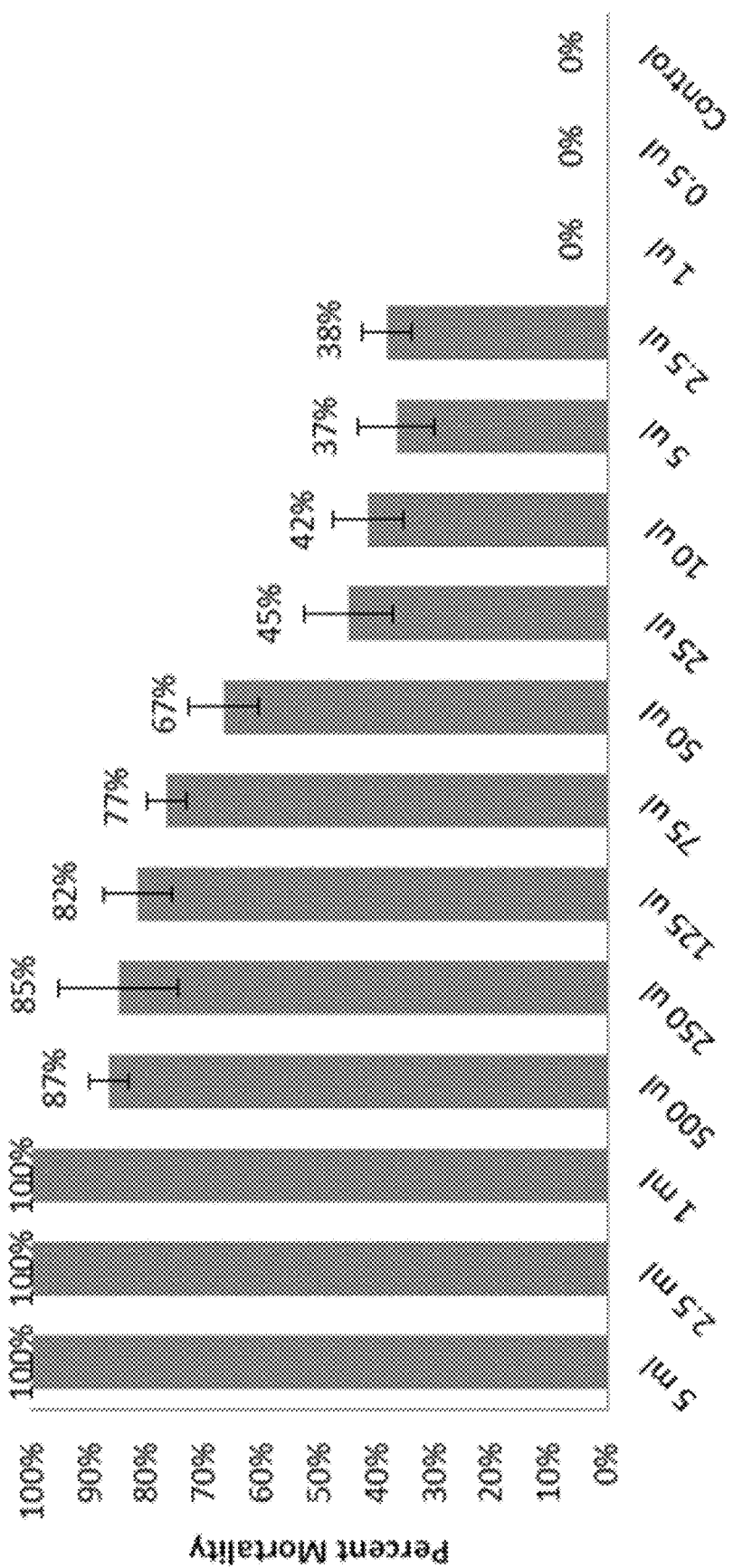
FIG. 7 illustrates the larvicidal activity of annatto extract 1 (AOE 1) after 24 hours post exposure. Y-axis represents the percent mortality after 24 hours of exposure to AOE 1. X-axis represents the amount of the AOE 1 added to 200 mL of distilled water.
Figure 8:
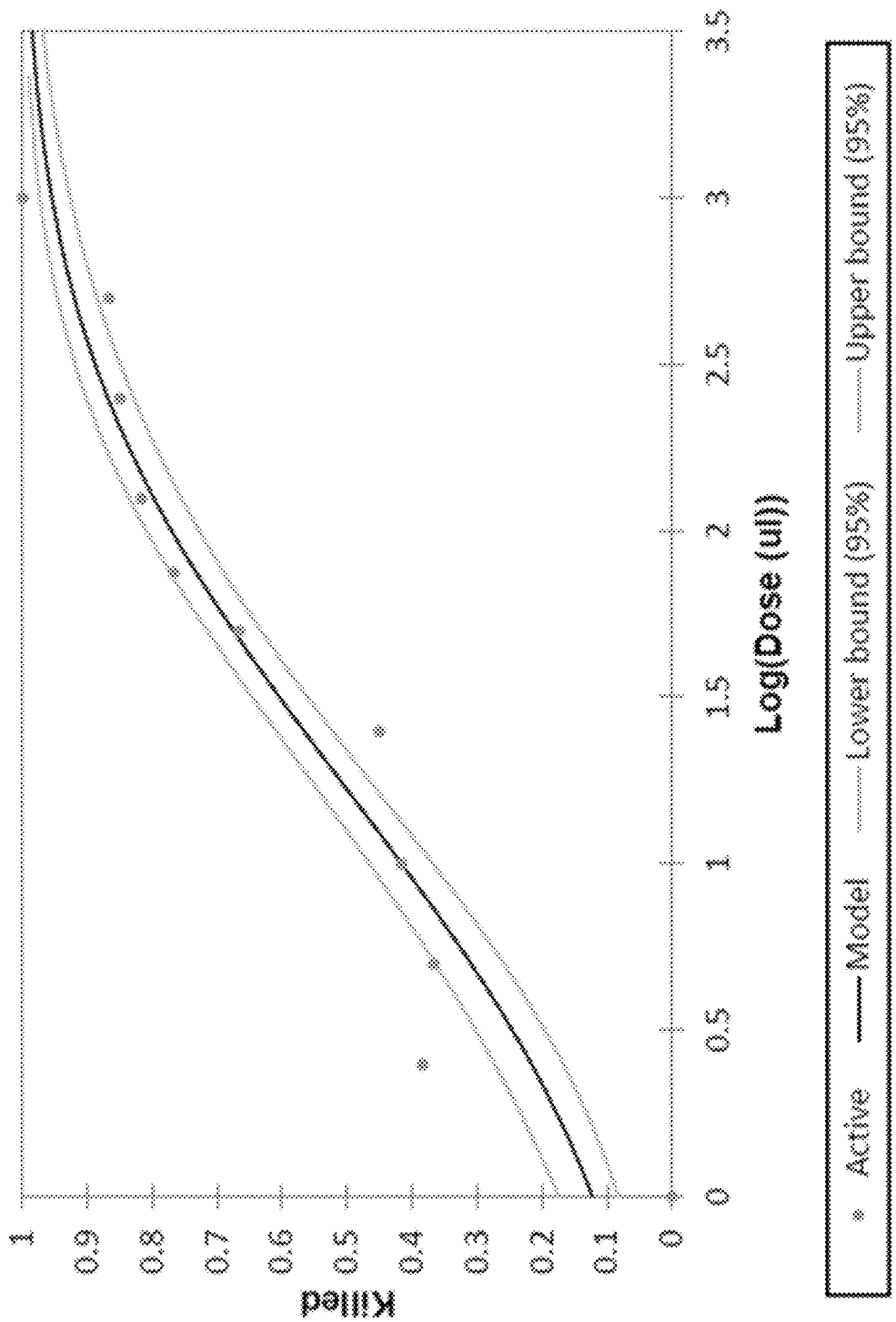
FIG. 8 illustrates the larvicidal activity of annatto extract 1 (AOE 1) after 24 hours post exposure. Logistical regression of killed by log (Dose (µl)) at 24 hours.

For larvicidal activity of annatto extract 1 (AOE 1), FIG. 6 is indicative of LD50 (1 hour) to be 0.25-1.0 mL/200 mL and LD 95 (1 hour) to be 2.5-5 mL/200 mL (FIG. 6). LD50 (24 hour) is 16.7 μL/200 mL and LD95 (24 hour) is 892.3 μL/200 mL (FIG. 7, FIG. 8 and Table 3).

TABLE 3

Larvicidal activity of annatto extract 1 (AOE 1) after 24 hours post exposure. Probability analysis with fitted model.

| Probability | Dose (ul) | Lower bound 95% | Upper bound 95% |
|---|---|---|---|
| 0.01 | 0.060 | 0.021 | 0.135 |
| 0.05 | 0.311 | 0.139 | 0.577 |
| 0.10 | 0.750 | 0.384 | 1.259 |
| 0.20 | 2.175 | 1.302 | 3.266 |
| 0.30 | 4.687 | 3.105 | 6.565 |
| 0.40 | 9.031 | 6.437 | 12.088 |
| 0.50 | 16.672 | 12.479 | 21.806 |
| 0.60 | 30.776 | 23.557 | 40.395 |
| 0.70 | 59.300 | 45.018 | 80.686 |

TABLE 3-continued

Larvicidal activity of annatto extract 1 (AOE 1) after 24 hours post exposure. Probability analysis with fitted model.

| Probability | Dose (ul) | Lower bound 95% | Upper bound 95% |
|---|---|---|---|
| 0.80 | 127.766 | 92.905 | 187.478 |
| 0.90 | 370.447 | 245.315 | 624.353 |
| 0.95 | 892.298 | 539.073 | 1710.848 |
| 0.99 | 4641.658 | 2324.809 | 11509.826 |

Example 6

Larvicidal Activity of Annatto Extract 2

Figure 9:
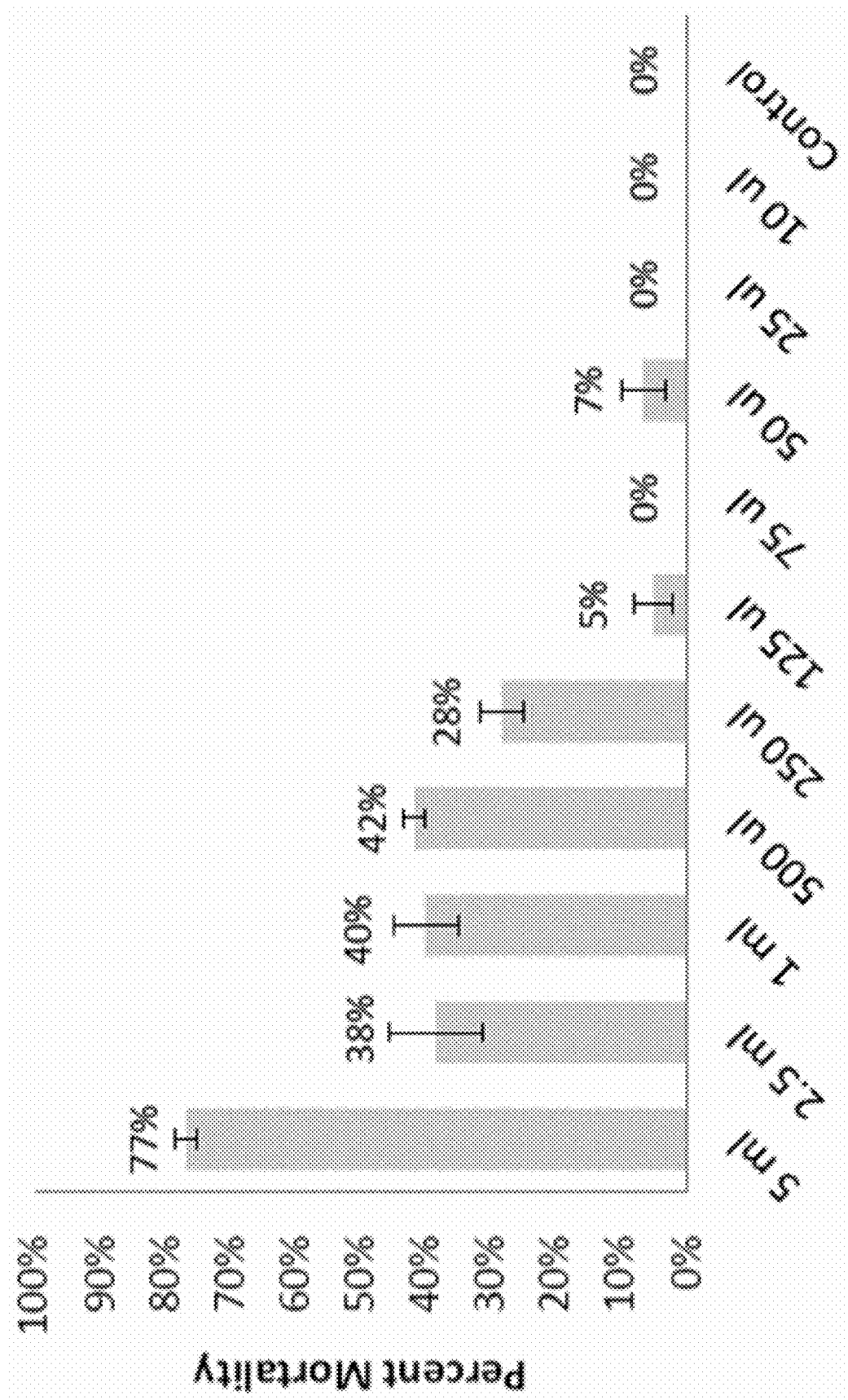
FIG. 9 illustrates the larvicidal activity of annatto extract 2 (AOE 2) after 1 hour post exposure. Y-axis represents the percent mortality after 1 hour of exposure to AOE 2. X-axis represents the amount of the AOE 2 added to 200 mL of distilled water.
Figure 10:
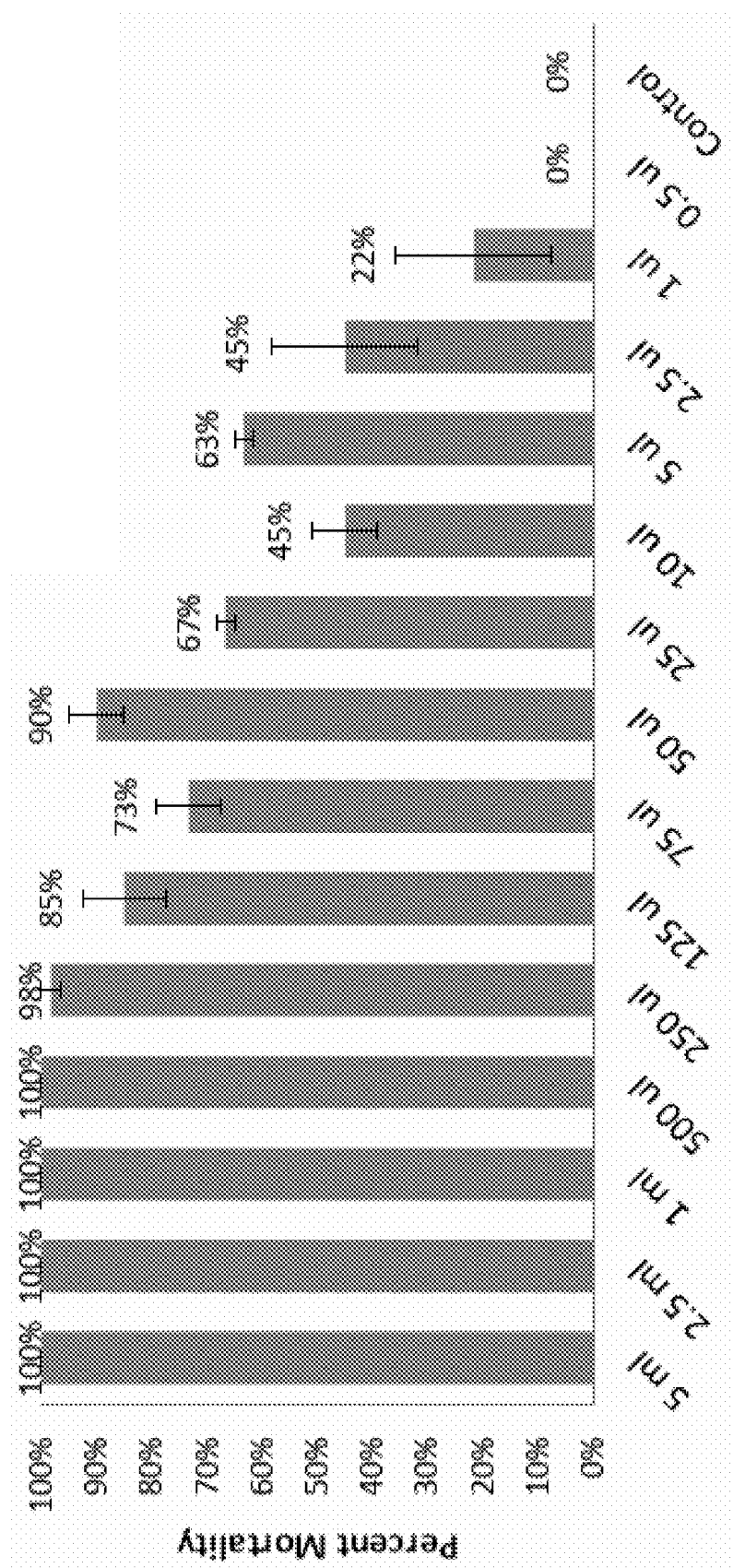
FIG. 10 illustrates the larvicidal activity of annatto extract 2 (AOE 2) after 24 hours post exposure. Y-axis represents the percent mortality after 24 hours of exposure to AOE 2. X-axis represents the amount of the AOE 2 added to 200 mL of distilled water.
Figure 11:
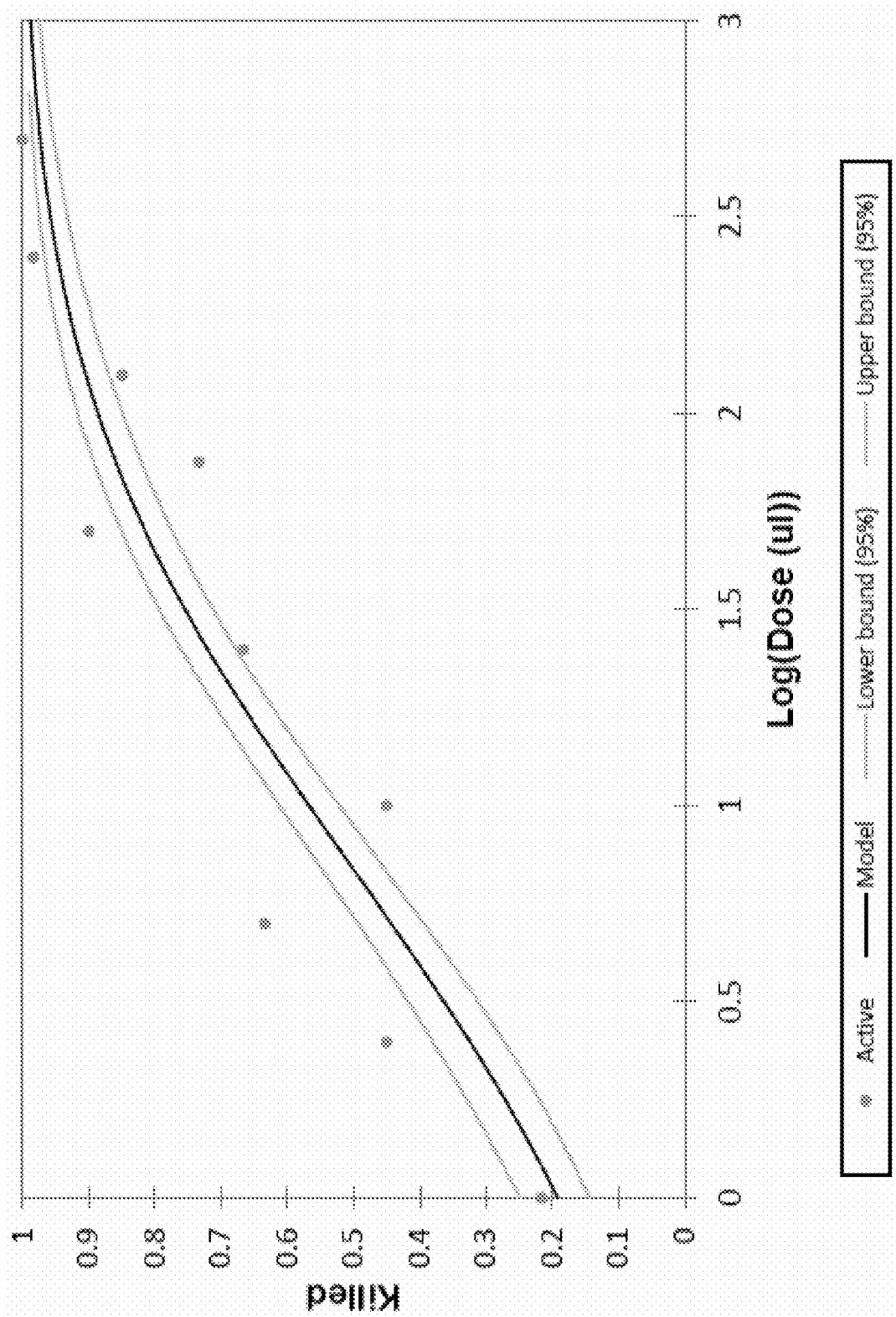
FIG. 11 illustrates the larvicidal activity of annatto extract 2 (AOE 2) after 24 hours post exposure. Logistical regression of killed by log (Dose (µl)) at 24 hours.

For larvicidal activity of annatto extract 2 (AOE 2), FIG. 9 is indicative of LD50 (1 hour) to be 2.5-5.0 mL/200 mL. LD50 (24 hour) is 6.9 µL/200 mL and LD95 (24 hour) is 263.7 µL/200 mL (FIG. 10, FIG. 11 and Table 4).

TABLE 4

Larvicidal activity of annatto extract 2 (AOE 2) after 24 hours post exposure. Probability analysis with fitted model.

| Probability | Dose (ul) | Lower bound 95% | Upper bound 95% |
|---|---|---|---|
| 0.01 | 0.039 | 0.015 | 0.082 |
| 0.05 | 0.178 | 0.087 | 0.313 |
| 0.10 | 0.399 | 0.218 | 0.642 |
| 0.20 | 1.060 | 0.661 | 1.548 |
| 0.30 | 2.143 | 1.458 | 2.947 |
| 0.40 | 3.909 | 2.833 | 5.167 |
| 0.50 | 6.859 | 5.190 | 8.871 |
| 0.60 | 12.032 | 9.312 | 15.550 |
| 0.70 | 21.955 | 16.956 | 29.097 |
| 0.80 | 44.381 | 33.210 | 62.372 |
| 0.90 | 117.789 | 81.687 | 185.446 |
| 0.95 | 263.739 | 169.260 | 462.820 |
| 0.99 | 1196.318 | 653.286 | 2614.870 |

Example 7

Larvicidal Activity of Annatto Extract 3

Figure 12:
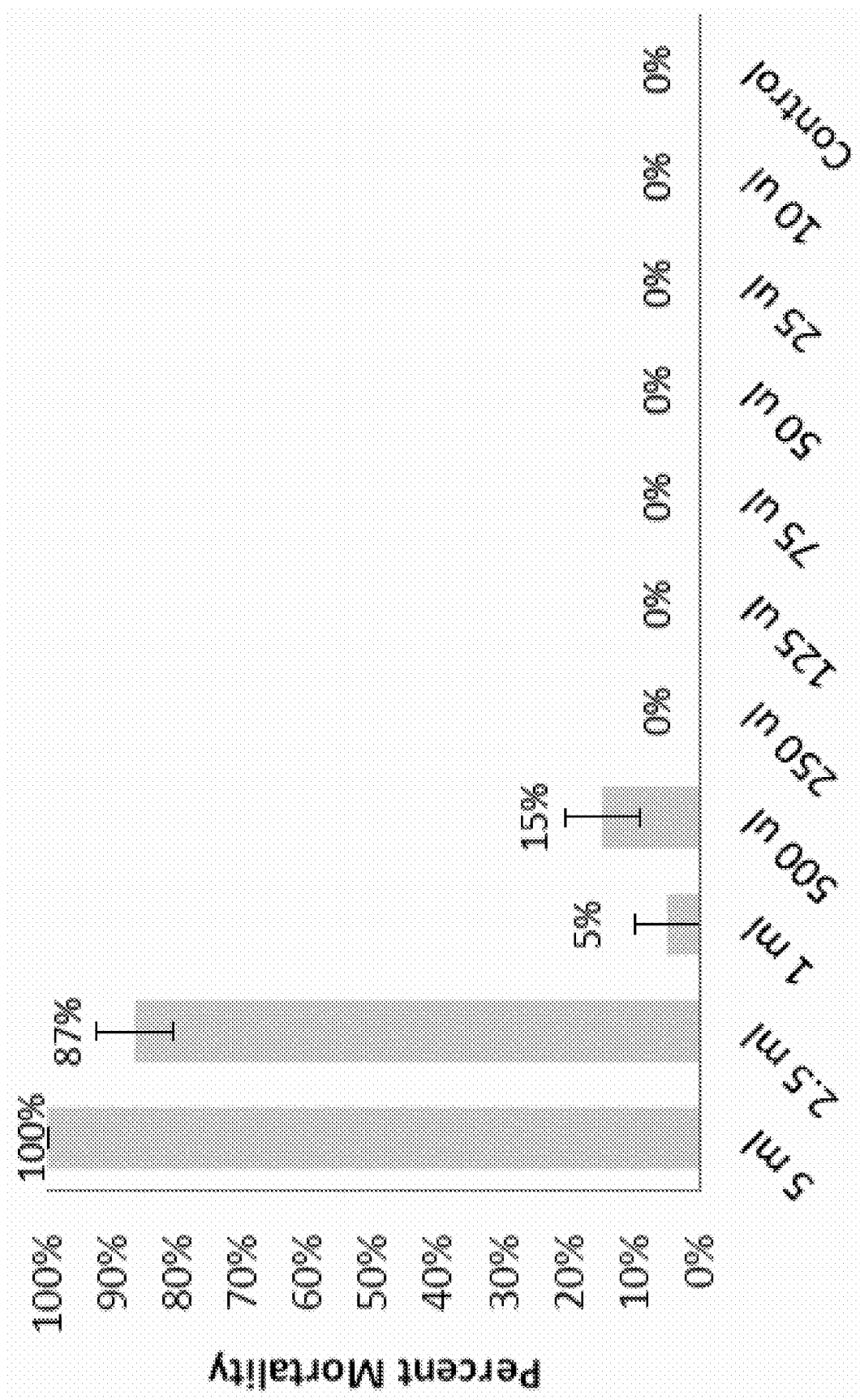
FIG. 12 illustrates the larvicidal activity of annatto extract 3 (AOE 3) after 1 hour post exposure. Y-axis represents the percent mortality after 1 hour of exposure to AOE 3. X-axis represents the amount of the AOE 3 added to 200 mL of distilled water.
Figure 13:
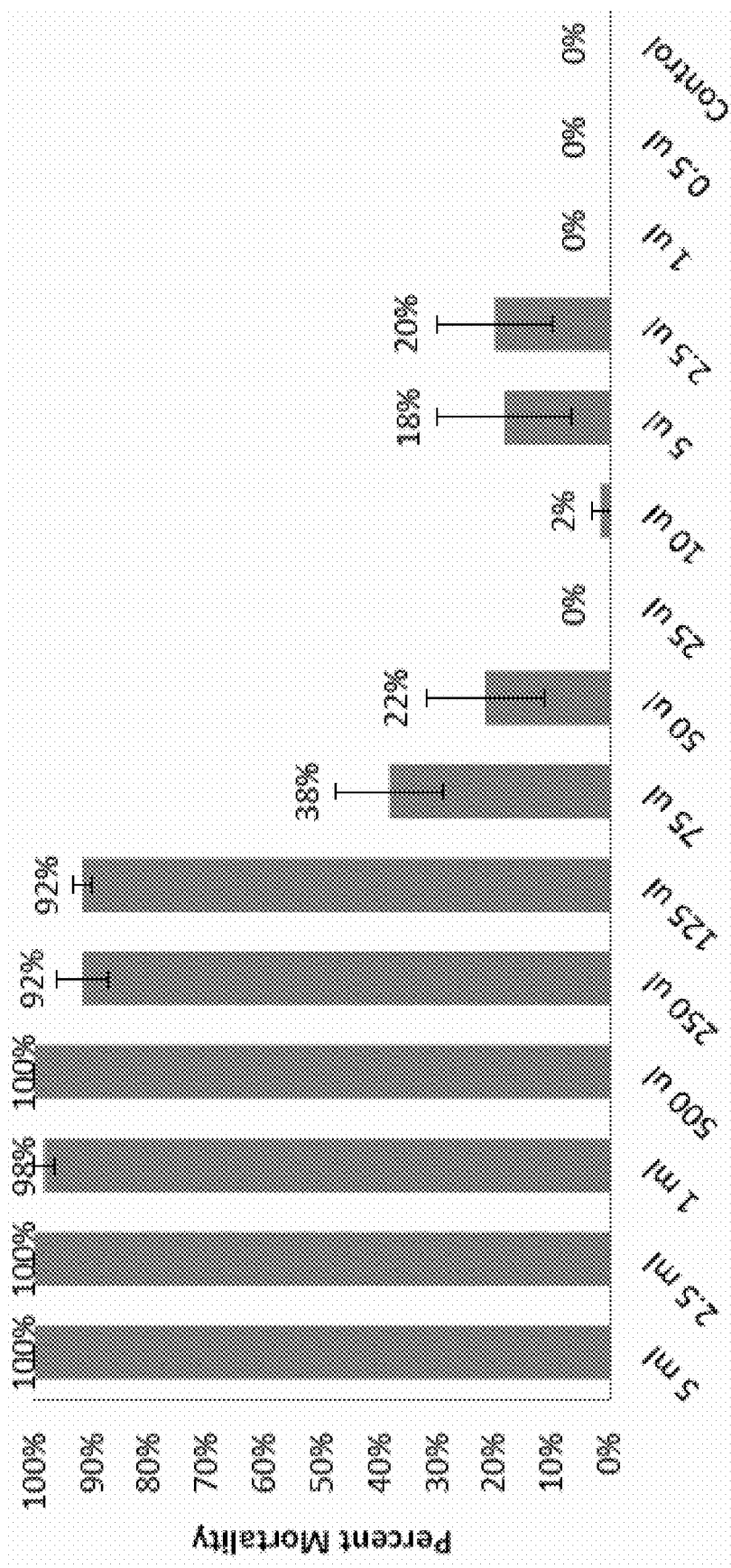
FIG. 13 illustrates the larvicidal activity of annatto extract 3 (AOE 3) after 24 hours post exposure. Y-axis represents the percent mortality after 24 hours of exposure to AOE 3. X-axis represents the amount of the AOE 3 added to 200 mL of distilled water.
Figure 14:
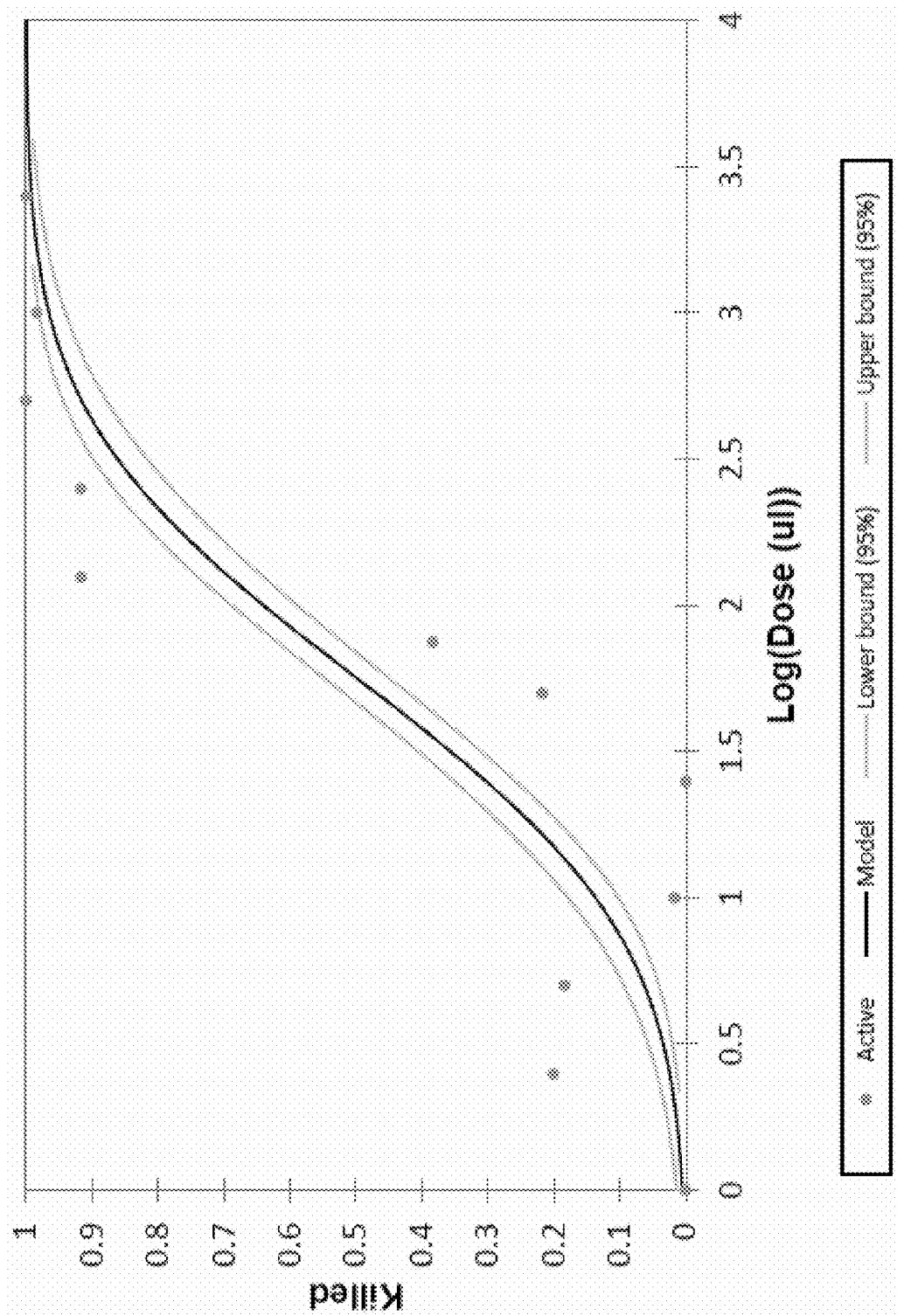
FIG. 14 illustrates the larvicidal activity of annatto extract 3 (AOE 3) after 24 hours post exposure. Logistical regression of killed by log (Dose (µl)) at 24 hours.

For larvicidal activity of annatto extract 3 (AOE 3), FIG. 12 is indicative of LD50 (1 hour) to be around 2.5 mL/200 mL. LD50 (24 hour) is 56.6 µL/200 mL and LD95 (24 hour) is 764.5 µL/200 mL (FIG. 13, FIG. 14 and Table 5).

TABLE 5

Larvicidal activity of annatto extract 3 (AOE 3) after 24 hours post exposure. Probability analysis with fitted model.

| Probability | Dose (ul) | Lower bound 95% | Upper bound 95% |
|---|---|---|---|
| 0.01 | 1.424 | 0.842 | 2.174 |
| 0.05 | 4.188 | 2.819 | 5.791 |
| 0.10 | 7.443 | 5.341 | 9.814 |
| 0.20 | 14.933 | 11.471 | 18.766 |
| 0.30 | 24.672 | 19.690 | 30.278 |
| 0.40 | 37.890 | 30.897 | 46.074 |
| 0.50 | 56.583 | 46.536 | 69.008 |
| 0.60 | 84.497 | 69.277 | 104.573 |
| 0.70 | 129.768 | 104.841 | 165.000 |
| 0.80 | 214.402 | 168.382 | 284.522 |
| 0.90 | 430.174 | 320.772 | 613.395 |
| 0.95 | 764.512 | 542.671 | 1164.285 |
| 0.99 | 2248.301 | 1443.047 | 3905.925 |

Example 8

Larvicidal Activity Summary of Annatto Extract 1, 2 and 3

From the summary in Table 6, annatto extract 1, 2 and 3 have strong larvicidal activity. The annatto extract 2 had the strongest larvicidal potency.

TABLE 6

Summary of application amounts to achieve an LD50 or LD95 at 24 hours' post application for each annatto extract.

| Annatto extract (AOE) | LD50 (24 hours) µL per L water | LD95 (24 hours) mL per L water |
|---|---|---|
| AOE 1 | 83.4 | 4.5 |
| AOE 2 | 34.3 | 1.3 |
| AOE 3 | 282.9 | 3.8 |

Example 9

Vacuum Distillation of Annatto Extracts

The essential oil of annatto is extracted by steam distillation, vacuum distillation, hydro distillation, solvent extraction, water or oil extraction, and headspace solid-phase microextraction (HS-SPME) from annatto seeds [5, 7-9, 18]. These processes are all inadequate to extract terpenoids for the intended purposes of repellency and larvicide use. These essential oil from annatto seeds usually has a large amount of very volatile compounds (<C10), monoterpenoids (C10), sesquiterpenoids (C15), and little diterpenoids (C20). The disclosed annatto oil extracts (AOE) have undergone vacuum distillation as disclosed in U.S. Pat. No. 6,350,453 (the contents of which are all herein incorporated by this reference in their entireties) and have a higher portion of diterpenoids (C20) and a lower portion of sesquiterpenoids (C15). The method of vacuum distillation removes very volatiles (≤C10) with at least two distillation steps at ≤100° C., and then distilled to obtain normal volatiles (C15 and C20) at >100° C. The procedure is solvent free process. The pressure is around 0.02 torr.

In examples 1, 2, 3 and 4 of U.S. Pat. No. 6,350,453, there are a total of 2-3 passes. AOE 1, AOE 2 and AOE 3 are from the first and/or the second pass. Tocotrienols are from the third pass. The distillation condition for pass 1 and/or 2 is 120° C.-130° C. and 0.03-0.08 torr; the distillation condition for pass 3 is 198° C.-210° C. and 0.01-0.09 torr.

The distillation to obtain the annatto oil extracts disclosed herein, up to total 5 passes are used. The condition in pass 1 may be around 120° C.-160° C. and vacuum may be around 0.03-2 torr. The condition in pass 2 may be around 160° C.-170° C. and vacuum may be around 0.03-0.6 torr. The condition in pass 3 to 5 may be even a higher temperature and vacuum (around 180° C.-250° C. and 0.01-0.7 torr). AOE 1 is from pass 1; AOE 2 and 3 are from pass 2. Tocotrienols are from pass 3-5. To obtain high concentrations of a specific compound, such as geranylgeraniol (90% in AOE 3), pass 2 is repeated several times, such as, passes 2-1, 2-2.

The difference between AOE 1, AOE 2 and AOE 3 is the composition and process. The compound in AOE 3 is 90% geranylgeraniol (diterpenoid) with higher molecular weight from passes with higher temperature and vacuum. The compounds in AOE 2 are intermediate molecular weight (Table 7), from passes with intermediate temperature and vacuum. The compounds in AOE 1 are lower molecular weight (details in Table 7), from passes with lower temperature and vacuum.

The composition of and the processes of producing AOE 1, 2 and 3 are repeatable. The composition of annatto extracts from different processes is different. For example, in pass 3-5, the major component of annatto extract is tocotrienols; however, in pass 1-2, the major components are terpenoids with lower molecular weight, since the process is milder. The disclosed mild process focuses on the terpenoids with lower molecular weight compared with tocotrienols (Table 7). Tocotrienols are minor and are used as antioxidants to extend shelf life of insect repellent and larvicide.

Example 10

Gas Chromatography-Mass Spectrometry (GC-MS) Analysis of Annatto Extracts

Annatto extract analysis was performed using an Agilent 7890B gas chromatograph (GC) coupled to a 7000C triple quad mass spectrometer and equipped with an Agilent HP-SMS-UI column (30 m; 0.25 mm i.d.; 0.25 µm film thickness). The carrier gas, helium, was at constant flow rate 1 mL/min. The oven temperature program was from 60° C., hold 1 min, and then from 60° C. to 280° C. at 4° C./min, hold 5 min, and finally from 280° C. to 325° C. at 30° C./min, hold 5 min. Total running time is 67.5 min. Inlet: heater (300° C.), pressure (8.2 psi), total flow (104 mL/min), purge flow (3 mL/min), split ratio (100:1) and split flow (100 mL/min). Compounds were identified either by the comparison with pure compounds or using the National Institute of Standards and Technology (NIST) MS spectral library database. About 0.1 grams of annatto extract was dissolved in hexane in a 10 mL volumetric flask, for which an aliquot of 1 µL was injected into the GC-MS for analysis.

The results show annatto extracts have a wide range of terpenoids including monoterpenoids, sesquiterpenoids and diterpenoids. The major sesquiterpenoid is ishwarane and 15-hydroxy-α-muurolene. The major diterpenoids are geranyl-α-terpinene, geranylgeraniol and cembrene. The three major compounds were ishwarane, geranyl-α-terpinene and geranylgeraniol. Tocotrienols are minor components in annatto extracts, approximately 1%. Major components in annatto extract compositions are shown in Table 7.

monoterpenoids are weaker than by sesquiterpenoids and diterpenoids in AOE 1, 2 and 3 in Table 7.

The combination of these monoterpenoids and sesquiterpenoid, diterpenoid of AOE 1 in Table 7 have strong insect repellent potential.

The combination of these monoterpenoids and sesquiterpenoid, diterpenoid of AOE 2 in Table 7 have strong larvicidal activity.

The ratio of ishwarane to geranyl-α-terpinene is disclosed in Table 7. The ratio of ishwarane to geranyl-α-terpinene in AOE 1 has the strongest insect repellency (Table 7 and FIG. 4). The ratio of ishwarane to geranyl-α-terpinene in AOE 2 has the strongest larvicide activity (Table 7 and Table 6).

In the disclosed annatto oil extract, the diterpenoids range from 40% to 75% and the sesquiterpenoids range from 13% to 45%.

AOE 3 (Table 7) has 90% geranylgeraniol which has larvicidal activity as disclosed in Example 7. AOE 3 has 91% of diterpenoids. The concentration of geranylgeraniol to sesquiterpenoids and diterpenoids is 99%.

AOE 2 (Table 7) has 23% geranylgeraniol which has larvicidal activity as disclosed in Example 6. AOE 2 has 16% of sesquiterpenoids and 74% of diterpenoids. The concentration of geranylgeraniol to sesquiterpenoids and diterpenoids is 26%.

AOE 1 (Table 7) has 6% geranylgeraniol which has larvicidal activity as disclosed in Example 5. AOE 1 has 38% of sesquiterpenoids and 52% diterpenoids. The concentration of geranylgeraniol to sesquiterpenoids and diterpenoids is 7%.

Thus, although the disclosed compositions and methods have been described and illustrated with a certain degree of particularity, it is understood that the present disclosure has been made only by way of example, and that numerous changes in the combination and arrangement of steps, ingredients, or processes can be resorted to by those skilled in the art without departing from the spirit and scope of the disclosed compositions and methods, as will be claimed hereafter.

REFERENCES

1. Tehri, K. and N. Singh, *The role of botanicals as green pesticides in integrated mosquito management—A review*. International Journal of Mosquito Research, 2015. 2(1): p. 18-23.

TABLE 7

| Compound identification of annatto extracts. | | | | | | | |
|---|---|---|---|---|---|---|---|
| No. | Compound | Category | M.W. | Formula | AOE 1 | AOE 2 | AOE 3 |
| 1 | Ishwarane | Sesquiterpenoid | 204 | $C_{15}H_{24}$ | 20% | 9% | |
| 4 | 15-hydroxy-α-muurolene | Sesquiterpenoid | 220 | $C_{15}H_{24}O$ | 5% | 5% | |
| 2 | Geranyl-α-terpinene | Diterpenoid | 272 | $C_{20}H_{32}$ | 22% | 16% | |
| 3 | Cembrene | Diterpenoid | 272 | $C_{20}H_{32}$ | 10% | 3% | |
| 5 | Geranylgeraniol | Diterpenoid | 290 | $C_{20}H_{34}O$ | 6% | 23% | 90% |

Annatto oil extracts are expected to have monoterpenoids with milder process such as lower temperature and vacuum. The concentration of monoterpenoids from annatto oil extract with milder process is from 3% to 30%. The major monoterpenoids are α-pinene, β-pinene, camphene, limonene, myrecene, cis-ocimene, chrysanthenone, and eucarvone.

The monoterpenoids, specifically α-pinene, β-pinene, camphene, limonene and myrecene have insect repellent potential and larvicidal activity, although these effects by 2. Debboun, M., S. P. Frances, and D. Strickman, *Insect repellents handbook.* 2014: CRC Press.

3. Zhu, J., et al., *Adult repellency and larvicidal activity of five plant essential oils against mosquitoes*. Journal of the American Mosquito Control Association, 2006. 22(3): p. 515-522.

4. Ghosh, A., N. Chowdhury, and G. Chandra, *Plant extracts as potential mosquito larvicides*. The Indian journal of medical research, 2012. 135(5): p. 581.

5. Jondiko, J., D. Akinyi, and M. Ndong'a, *Mosquito repellency and larvicidal activities of essential oils from the seeds of annatto (Bixa orellana L.)*. Aspects of Applied Biology, 2009(96): p. 337-342.
6. Daniel Francisco De Souza, A. L. C., *Process of extraction and separation and characterization of a fraction of seeds of annatto (urucum) with mosquito repellent activity in Aedes aegypti*. Patent in Brazil, 2016. PCT 00.000.2.2.16.0495696.2(Process Number: BR 10 2016 017229 2).
7. Giorgi, A., et al., *Secondary metabolite profile, antioxidant capacity, and mosquito repellent activity of Bixa orellana from Brazilian Amazon region*. Journal of Chemistry, 2013. 2013.
8. Giwa-Ajeniya, A. O., et al., *Chemical Composition of Essential Oils from the Leaves, Seeds, Seed-pods and Stems of Bixa orellana L. (Bixaceae)*. Methodology, 2014.
9. Galindo-Cuspinera, V., M. B. Lubran, and S. A. Rankin, *Comparison of volatile compounds in water-and oil-soluble annatto (Bixa orellana L.) extracts*. Journal of agricultural and food chemistry, 2002. 50(7): p. 2010-2015.
10. Rodriguez, S. D., et al., *The efficacy of some commercially available insect repellents for Aedes aegypti (Diptera: Culicidae) and Aedes albopictus (Diptera: Culicidae)*. Journal of insect Science, 2015. 15(1): p. 140.
11. Schmidt, E., et al., *Chemical composition, olfactory evaluation and antioxidant effects of essential oil from Mentha×piperita*. Natural product communications, 2009. 4(8): p. 1107-1112.
12. Kumar, S., N. Wahab, and R. Warikoo, *Bioefficacy of Mentha piperita essential oil against dengue fever mosquito Aedes aegypti L*. Asian Pacific journal of tropical biomedicine, 2011. 1(2): p. 85-88.
13. Oyedele, A., et al., *Formulation of an effective mosquito-repellent topical product from lemongrass oil*. Phytomedicine, 2002. 9(3): p. 259-262.
14. Snoussi, M., et al., *Mentha spicata essential oil: chemical composition, antioxidant and antibacterial activities against planktonic and biofilm cultures of Vibrio spp. strains*. Molecules, 2015. 20(8): p. 14402-14424.
15. Paranagama, P., et al., *A comparison of essential oil constituents of bark, leaf root and fruit of cinnamon (Cinnamomum zeylanicum Blum) grown in Sri Lanka*. Journal of the National Science Foundation of Sri Lanka, 2001. 29(3-4).
16. Organization, W. H., *Guidelines for efficacy testing of spatial repellents*. 2013.
17. Organization, W. H., *Guidelines for laboratory and field testing of mosquito larvicides*. 2005.
18. Pino, J. A. and M. T. Correa, *Chemical composition of the essential oil from annatto (Bixa orellana L.) seeds*. Journal of Essential Oil Research, 2003. 15(2): p. 66-67.

The invention claimed is:

1. A composition comprising ishwarane and geranyl-α-terpinene, wherein the ratio of ishwarane to geranyl-α-terpinene is 60:40 to 40:60 by volume and wherein the concentration of geranyl-α-terpinene is from 10% to 25% of the total volume of the composition.

2. A composition comprising geranylgeraniol, geranyl-α-terpinene, ishwarane, 15-hydroxy-α-muurolene, and cembrene, wherein the concentration of geranyl-α-terpinene is from 10% to 25% of the total volume of the composition, the concentration of ishwarane is from 5% to 25% of the total volume of the composition, the concentration of 15-hydroxy-α-muurolene is from 1% to 10% of the total volume of the composition, the concentration of cembrene is from 1% to 15% of the total volume of the composition, and the concentration of geranylgeraniol is from 5% to 35% of the total volume of the composition.

3. The composition of claim 1 further comprising 15-hydroxy-α-muurolene, cembrene, and geranylgeraniol.

4. The composition of claim 3, wherein the concentration of ishwarane is from 10% to 20% of the total volume of the composition, the concentration of 15-hydroxy-α-muurolene is from 3% to 17% of the total volume of the composition, the concentration of geranyl-α-terpinene is from 15% to 20% of the total volume of the composition, the concentration of cembrene is from 5% to 10% of the total volume of the composition, and the concentration of geranylgeraniol is from 10% to 30% of the total volume of the composition.

5. A composition comprising two C15 compounds and three C20 compounds, wherein the total concentration of the C15 compounds is from 1% to 40% of the total volume of the composition and the total concentration of the C20 compounds is from 10% to 70% of the total volume of the composition, wherein the two C15 compounds are ishwarane and 15-hydroxy-α-muurolene and the three C20 compounds are geranyl-α-terpinene, cembrene, and geranylgeraniol.

6. The composition of claim 5, wherein the concentration of C15 compounds is from 5% to 30% of the total volume of the composition and the concentration of C20 compounds is from 15% to 60% of the total volume of the composition.

7. The composition of claim 6, wherein the concentration of C15 compounds is from 10% to 20% of the total volume of the composition and the concentration of C20 compounds is from 20% to 50% of the total volume of the composition.

8. The composition of claim 3, wherein the concentration of ishwarane is 20% of the total volume of the composition, the concentration of 15-hydroxy-α-muurolene is 5% of the total volume of the composition, the concentration of geranyl-α-terpinene is 22% of the total volume of the composition, the concentration of cembrene is 10% of the total volume of the composition, and the concentration of geranylgeraniol is 6% of the total volume of the composition.

9. The composition of claim 3, further comprising at least one of peppermint oil, lemongrass oil, spearmint oil, cinnamon oil, and oil of lemon *eucalyptus*.

10. The composition of claim 2, wherein the concentration of ishwarane is 9% of the total volume of the composition, the concentration of 15-hydroxy-q-muurolene is 5% of the total volume of the composition, the concentration of geranyl-q-terpinene is 16% of the total volume of the composition, the concentration of cembrene is 3% of the total volume of the composition, and the concentration of geranylgeraniol is 23% of the total volume of the composition.

11. A method of repelling an arthropod away from human skin comprising applying topically the composition of claim 1 on the human skin.

12. The method of claim 11, wherein the arthropod is selected from the group consisting of insect and arachnid.

13. A method of killing an arthropod comprising contacting the composition of claim 2 to the arthropod.

14. The method of claim 13, wherein the arthropod is selected from the group consisting of insect and arachnid.

15. A method of repelling or killing an arthropod away from, or on, human skin comprising topically applying the composition of claim 3 on the human skin.

16. The method of claim 15, wherein the arthropod is selected from the group consisting of insect and arachnid.

17. The method of claim 11, wherein the composition is as effective as 20% of N,N-diethyl-3-methylbenzamide (DEET) for a 2 hour repellency duration.

18. The method of claim 15, wherein the composition has a $LD_{50}$ from about 34 µl/L to about 282 µl/L in water at about 24 hours after application of the composition.

19. The method of claim 15, wherein the composition has a $LD_{95}$ from about 1.3 ml/L to about 4.5 ml/L in water at about 24 hour after application of the composition.

\* \* \* \* \*